US011284375B2

(12) United States Patent
Liu et al.

(10) Patent No.: US 11,284,375 B2
(45) Date of Patent: Mar. 22, 2022

(54) RESOURCE ALLOCATION METHOD AND APPARATUS

(71) Applicant: HUAWEI TECHNOLOGIES CO., LTD., Guangdong (CN)

(72) Inventors: Jing Liu, Shanghai (CN); Rui Wang, Shanghai (CN); Mingzeng Dai, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 111 days.

(21) Appl. No.: 16/805,645

(22) Filed: Feb. 28, 2020

(65) Prior Publication Data

US 2020/0205132 A1 Jun. 25, 2020

Related U.S. Application Data

(63) Continuation of application No. PCT/CN2018/103665, filed on Aug. 31, 2018.

(30) Foreign Application Priority Data

Sep. 1, 2017 (CN) ........................ 201710780988.1

(51) Int. Cl.
*H04L 5/00* (2006.01)
*H04W 28/16* (2009.01)
(Continued)

(52) U.S. Cl.
CPC ........... *H04W 72/04* (2013.01); *H04L 5/0053* (2013.01)

(58) Field of Classification Search
CPC ........ H04L 5/00; H04L 5/0012; H04W 28/16; H04W 72/1263; H04W 84/047; H04W 84/18; H04W 72/0448; H04W 40/32
See application file for complete search history.

(56) References Cited

U.S. PATENT DOCUMENTS

2008/0175240 A1* 7/2008 Suzuki .................... H04L 12/18 370/390
2009/0201846 A1 8/2009 Horn et al.
(Continued)

FOREIGN PATENT DOCUMENTS

CN 1992922 A 7/2007
CN 101946549 A 1/2011
(Continued)

OTHER PUBLICATIONS

CN 1992922, Aparatus and Method for Supporting Multilink by Grouping Multihop in Cellular Network of Multihop Relay System, Author: Lee Mi-hyun, publication date: Apr. 7, 2007 (Year: 2007).*

*Primary Examiner* — Faruk Hamza
*Assistant Examiner* — Abusayeed M Haque
(74) *Attorney, Agent, or Firm* — Womble Bond Dickinson (US) LLP

(57) ABSTRACT

A resource allocation method includes: receiving, by a first radio access network node in a first-type radio access network node, resource configuration information, where the resource configuration information includes at least two groups of resource information; and using, by the first radio access network node, the resource indicated by one group of resource information in the resource configuration information as the transmission resource used in the second link of the first radio access network node.

16 Claims, 12 Drawing Sheets

First radio access network node
Previous-hop radio access network node
Second radio access network node
801. Receive resource configuration information
801a. Resource configuration information
801b. Resource configuration information
901. Receive group attribute information
901a. Group attribute information
901b. Group information
902. Determine, based on the group attribute information, a transmission resource group used in a second link of the first radio access network node
903. Determine that a resource indicated by one group of resource information corresponding to the transmission resource group that is used in the second link and that is included in global resource configuration information is a transmission resource used in the second link of the first radio access network node
904. Determine, based on the global resource configuration information, a transmission resource used in a first link of the first radio access network node

(51) Int. Cl.
*H04W 40/22* (2009.01)
*H04W 72/04* (2009.01)

(56) References Cited

U.S. PATENT DOCUMENTS

2010/0100908 A1* 4/2010 Zhang .............. H04N 21/26283 725/51
2010/0318659 A1 12/2010 Chang et al.
2011/0286450 A1* 11/2011 Wijnands ................ H04L 45/04 370/390
2012/0155511 A1* 6/2012 Shaffer .................. H04B 1/713 375/133
2014/0044015 A1* 2/2014 Chen ................... H04L 41/0663 370/255
2015/0029855 A1* 1/2015 Zheng ..................... H04L 45/22 370/235
2015/0127733 A1* 5/2015 Ding ..................... H04W 8/005 709/204
2015/0372925 A1* 12/2015 Chu ...................... H04W 72/04 370/331
2016/0119229 A1* 4/2016 Zhou ................... H04L 12/4641 370/392
2017/0033833 A1* 2/2017 Terry ................... H04B 1/7136
2017/0289114 A1* 10/2017 Wood .................. H04L 63/0435
2018/0013666 A1* 1/2018 Wood ...................... G06F 16/22
2018/0287935 A1* 10/2018 Wang .................. H04L 12/4633
2020/0196348 A1* 6/2020 Fan ........................... H04L 1/08
2020/0220742 A1* 7/2020 Zhang ................. H04L 12/1868
2020/0336987 A1* 10/2020 Mukherjee .......... H04W 52/146

FOREIGN PATENT DOCUMENTS

| | | | |
|---|---|---|---|
| CN | 105992368 | A | 10/2016 |
| EP | 1890402 | A2 | 2/2008 |
| EP | 2217012 | A1 | 8/2010 |
| JP | 2003258719 | A | 9/2003 |
| WO | 2007120023 | A1 | 10/2007 |
| WO | 2010127963 | A2 | 11/2010 |

* cited by examiner

RESOURCE ALLOCATION METHOD AND APPARATUS

CROSS-REFERENCE TO RELATED APPLICATIONS

This application is a continuation of International Application No. PCT/CN2018/103665, filed on Aug. 31, 2018, which claims priority to Chinese Patent Application No. 201710780988.1, filed on Sep. 1, 2017. The disclosures of the aforementioned applications are herein incorporated by reference in their entireties.

TECHNICAL FIELD

This application relates to the field of wireless communications technologies, and in particular, to a resource allocation method and apparatus.

BACKGROUND

With development of communications technologies, a relay technology is introduced in long term evolution R10. As shown in FIG. 1, a relay node (Relay Node, RN) communicates with a donor eNB (DeNB) through a backhaul link, and communicates with user equipment (User Equipment, UE) through an access link. The UE may use a relay cell as an independent accessible cell. The RN may directly schedule the UE in the relay cell. UE within coverage of the DeNB may directly access a cell served by the DeNB.

In an in-band operation mode, the access link and the backhaul link use resources of a same frequency. To avoid interference between the access link and the backhaul link, different subframe resources are allocated to the access link and the backhaul link for respective data transmission. A subframe allocated to the access link is an access subframe, and a subframe allocated to the backhaul link is a relay subframe. UE served by the RN may transmit data on an access subframe. UE served by the DeNB generally transmits data also on an access subframe. Alternatively, when there is a remaining relay subframe, the DeNB may schedule the UE to transmit data on the relay subframe.

However, the R10 relay supports only a simple single-hop RN deployment scenario, and cannot meet more diversified requirements of a future network, for example, more flexible deployment, wider coverage, and a more flexible resource allocation manner. Therefore, to meet increasing communication requirements, a plurality of hops of RNs need to be deployed. However, at present, the method for allocating resources to the access link and the backhaul link of the RN cannot be directly extended to a multi-hop RN scenario. In the multi-hop scenario, if an existing R10 RN system resource allocation method is directly used, a same access link resource and backhaul link resource may be allocated to all RNs. Therefore, when an RN other than the first-hop RN accesses another RN, the accessed RN also works in the backhaul link. Consequently, a relay subframe of the RN other than the first-hop RN conflicts with a relay subframe of the RN accessed by the RN other than the first-hop RN, and the accessed RN cannot provide a service for the RN other than the first-hop RN. Therefore, how to allocate a resource to an RN in a multi-hop RN deployment scenario is a technical problem that urgently needs to be resolved.

SUMMARY

Embodiments of this application provide a resource allocation method and apparatus, to resolve a problem in the prior art that a resource cannot be allocated to an RN in a multi-hop RN deployment scenario.

To achieve the foregoing objective, the following technical solutions are used in this application:

According to a first aspect, an embodiment of this application provides a resource allocation method. The method includes:

receiving, by a first radio access network node in a first-type radio access network node, resource configuration information, where the resource configuration information includes at least two groups of resource information, a resource indicated by one group of resource information is a transmission resource used in a second link of the first radio access network node, and a resource indicated by the other group of resource information is a transmission resource used in a second link of a next-hop radio access network node accessing the first radio access network node; and using, by the first radio access network node, the resource indicated by one group of resource information in the resource configuration information as the transmission resource used in the second link of the first radio access network node.

The first-type radio access network node is an RN. The first radio access network node is an RN that has accessed a network but to which a transmission resource has not been allocated yet. The second link is a backhaul link of the RN.

By using the method, the first radio access network node may determine, based on the received resource configuration information, the transmission resource used in the second link of the first radio access network node. The resource indicated by one group of resource information in the resource configuration information is the transmission resource used in the second link of the first radio access network node, and the resource indicated by the other group of resource information is the transmission resource used in the second link of the next-hop radio access network node accessing the first radio access network node. Therefore, transmission resources used in second links of neighboring-hop radio access network nodes are different, and a case in which the first radio access network node and a previous-hop radio access network node use a same backhaul link resource does not occur. In this way, a problem that the previous-hop radio access network node cannot provide a data backhaul service for the first radio access network node because the first radio access network node and a backhaul link of the previous-hop radio access network node accessed by the first radio access network node use a same transmission resource can be avoided.

In one embodiment, the resource configuration information includes a combination of any one or more pieces of the following information: global resource configuration information, transmission resource information used in a first link of a previous-hop radio access network node accessed by the first radio access network node, and transmission resource information used in a second link of the previous-hop radio access network node; and the global resource configuration information includes a combination of any one or more pieces of the following information: a quantity of transmission resource groups used in a second link, one group of resource information that is in the at least two groups of resource information and that corresponds to a transmission resource group used in each second link, a grouping mode of a transmission resource used in the second link, an index value of the grouping mode of the transmission resource used in the second link, a configuration manner of a transmission resource used in the first link and transmission resources used in second links of various groups of first-type radio access network nodes, an index value of the configuration manner of the transmission resource used in the first link and the transmission resources used in the second links of the various groups of first-type radio access network nodes, a configuration manner of transmission resources used in various groups of second links, and an index value of the configuration manner of the transmission resources used in the various groups of second links.

In one embodiment, the first radio access network node may further receive group attribute information, where the group attribute information includes a combination of any one or more pieces of the following information: a group index of the previous-hop radio access network node, a quantity of hops of the previous-hop radio access network node, parity of the quantity of hops of the previous-hop radio access network node, a group index of the first radio access network node, a quantity of hops of the first radio access network node, and parity of the quantity of hops of the first radio access network node.

The first radio access network node is an RN that has accessed a network but to which a transmission resource has not been allocated yet.

In one embodiment, the global resource configuration information further includes a transmission resource group used in the first link or the transmission resource information used in the first link, the transmission resource group used in the first link includes the transmission resource information used in the first link, and a resource indicated by the transmission resource information used in the first link is a transmission resource used in a first link of each hop of radio access network node in the first-type radio access network node.

The first-type radio access network node is an RN. The first link is an access link between the RN and a terminal device.

In one embodiment, the global resource configuration information further includes transmission resource indication information used in the first link, where the transmission resource indication information is used to indicate that a transmission resource used in a first link of the first radio access network node is the same as the transmission resource used in the second link of the next-hop radio access network node; or a transmission resource used in a first link of the first radio access network node is a part of the transmission resource used in the second link of the next-hop radio access network node.

In one embodiment, after the first radio access network node in the first-type radio access network node receives the resource configuration information, the first radio access network node may determine that the resource indicated by the transmission resource information that is used in the first link and that is included in the global resource configuration information is the transmission resource used in the first link of the first radio access network node.

In one embodiment, the first radio access network node may receive resource configuration information from the previous-hop radio access network node, where the resource configuration information is the global resource configuration information. Then, the first radio access network node determines, based on the group attribute information, a transmission resource group used in the second link of the first radio access network node. Further, the first radio access network node determines that a resource indicated by one group of resource information corresponding to the transmission resource group that is used in the second link and that is included in the global resource configuration information is the transmission resource used in the second link of the first radio access network node.

The first radio access network node is an RN that has accessed a network but to which a transmission resource has not been allocated yet. The first link is an access link. The second link is a backhaul link.

In one embodiment, the first radio access network node receives resource configuration information from the previous-hop radio access network node, where the resource configuration information includes the global resource configuration information, the transmission resource information used in the first link of the previous-hop radio access network node, and the transmission resource information used in the second link of the previous-hop radio access network node. Then, the first radio access network node determines that a resource indicated by one group of resource information different from the transmission resource information that is used in the second link of the previous-hop radio access network node and that is included in the global resource configuration information is the transmission resource used in the second link of the first radio access network node. The first radio access network node determines that a resource indicated by the transmission resource information used in the first link of the previous-hop radio access network node is the transmission resource used in the first link of the first radio access network.

The first radio access network node is an RN that has accessed a network but to which a transmission resource has not been allocated yet. The first link is an access link. The second link is a backhaul link.

In one embodiment, the first radio access network node receives resource configuration information from the previous-hop radio access network node, where the resource configuration information includes at least one of the global resource configuration information, the transmission resource information used in the second link of the previous-hop radio access network node, and the transmission resource information used in the first link of the previous-hop radio access network node. Then, the first radio access network node determines that a resource indicated by one group of resource information different from the transmission resource information that is used in the second link of the previous-hop radio access network node and that is included in the global resource configuration information is the transmission resource used in the second link of the first radio access network node; or the first radio access network node determines that all or a part of a resource indicated by the transmission resource information used in the first link of the previous-hop radio access network node is the transmission resource used in the second link of the first radio access network. The first radio access network node may further determine, based on the transmission resource information used in the second link of the first radio access network node and the global resource configuration information, the transmission resource used in the first link of the first radio access network node.

The first radio access network node is an RN that has accessed a network but to which a transmission resource has not been allocated yet. The first link is an access link. The second link is a backhaul link.

In one embodiment, the first radio access network node generates local resource configuration information of the next-hop radio access network node based on at least one of the group attribute information, the transmission resource used in the second link of the first radio access network node, and the global resource configuration information, where the local resource configuration information of the next-hop radio access network node includes the transmission resource information used in a first link of the next-hop radio access network node and transmission resource information used in the second link of the next-hop radio access network node. Then, the first radio access network node sends the local resource configuration information of the next-hop radio access network node to the next-hop radio access network node.

The first radio access network node is an RN that has accessed a network but to which a transmission resource has not been allocated yet. The first link is an access link. The second link is a backhaul link.

By using the method, the first radio access network node may generate the local resource configuration information for the next-hop radio access network node. Because a transmission resource that is used in a second link in each hop of first-type radio access network node and that is included in the global resource configuration information is different, the first radio access network node configures, for the next-hop radio access network node based on the global resource configuration information, transmission resource information different from the transmission resource information used in the second link of the first radio access network node. Therefore, a case in which neighboring-hop radio access network nodes use a same backhaul link resource does not occur. Further, interference caused because the neighboring-hop radio access network nodes use a transmission resource used in a same second link can be avoided. Moreover, no multi-hop radio frequency transceiver apparatus or complex intra-device interference processing unit needs to be configured for the first radio access network node, thereby reducing costs.

In one embodiment, the first radio access network node receives the resource configuration information from the second radio access network node in the second-type radio access network node, where the resource configuration information includes the global resource configuration information. The first-type radio access network node receives the group attribute information from the second radio access network node. Then, the first radio access network node determines, based on the group attribute information, a transmission resource group used in the second link of the first radio access network node. Further, the first radio access network node determines that a resource indicated by one group of resource information corresponding to the transmission resource group that is used in the second link and that is included in the global resource configuration information is the transmission resource used in the second link of the first radio access network node.

The first radio access network node is an RN that has accessed a network but to which a transmission resource has not been allocated yet. The second-type radio access network node is a donor base station. The second radio access network node is a donor base station accessed by the first radio access network node. The first link is an access link. The second link is a backhaul link.

In one embodiment, a boundary of an uplink subframe in the transmission resource used in the second link of the first radio access network node is aligned with a boundary of a downlink subframe in a transmission resource used in a second link of a neighboring-hop first-type radio access network node, and a boundary of a downlink subframe in the transmission resource used in the second link of the first radio access network node is aligned with a boundary of an uplink subframe in the transmission resource used in the second link of the neighboring-hop first-type radio access network node.

According to a second aspect, an embodiment of this application provides a resource allocation method. The method includes:

sending, by a second radio access network node in a second-type radio access network node, resource configuration information to a first radio access network node in a first-type radio access network node, where the resource configuration information includes at least two groups of resource information, a resource indicated by one group of resource information is a transmission resource used in a second link of the first radio access network node in the first-type radio access network node, and a resource indicated by the other group of resource information is a transmission resource used in a second link of a next-hop radio access network node accessing the first radio access network node.

The first-type radio access network node is an RN. The first radio access network node is an RN that has accessed a network but to which a transmission resource has not been allocated yet. The second-type radio access network node is a donor base station. The second radio access network node is a donor base station accessed by the first radio access network node. The second link is a backhaul link.

By using the method, the first radio access network node may determine, based on the received resource configuration information, the transmission resource used in the second link of the first radio access network node. The resource indicated by one group of resource information in the resource configuration information is the transmission resource used in the second link of the first radio access network node, and the resource indicated by the other group of resource information is the transmission resource used in the second link of the next-hop radio access network node accessing the first radio access network node. Therefore, transmission resources used in second links of neighboring-hop radio access network nodes are different, and a case in which the first radio access network node and a previous-hop radio access network node use a same backhaul link resource does not occur. In this way, a problem that the previous-hop radio access network node cannot provide a data backhaul service for the first radio access network node because the first radio access network node and a backhaul link of the previous-hop radio access network node accessed by the first radio access network node use a same transmission resource can be avoided.

In one embodiment, the resource configuration information includes global resource configuration information. The global resource configuration information includes a combination of any one or more pieces of the following information: a quantity of transmission resource groups used in a second link, one group of resource information that is in the at least two groups of resource information and that corresponds to a transmission resource group used in each second link, a grouping mode of a transmission resource used in the second link, an index value of the grouping mode of the transmission resource used in the second link, a configuration manner of a transmission resource used in the first link and transmission resources used in second links of various groups of first-type radio access network nodes, an index value of the configuration manner of the transmission resource used in the first link and the transmission resources used in the second links of the various groups of first-type radio access network nodes, a configuration manner of transmission resources used in various groups of second links, and an index value of the configuration manner of the transmission resources used in the various groups of second links.

The first-type radio access network node is an RN. The first radio access network node is an RN that has accessed a network but to which a transmission resource has not been allocated yet. The second link is a backhaul link.

In one embodiment, the global resource configuration information further includes a transmission resource group used in the first link or the transmission resource information used in the first link, the transmission resource group used in the first link includes the transmission resource information used in the first link, and a resource indicated by the transmission resource information used in the first link is a transmission resource used in a first link of each hop of radio access network node in the first-type radio access network node.

The first-type radio access network node is an RN. The first link is an access link.

In one embodiment, the global resource configuration information further includes transmission resource indication information used in the first link, where the transmission resource indication information used in the first link is used to indicate that a transmission resource used in a first link of the first radio access network node is the same as the transmission resource used in the second link of the next-hop radio access network node, or a transmission resource used in a first link of the first radio access network node is a part of the transmission resource used in the second link of the next-hop radio access network node.

The first radio access network node is an RN that has accessed a network but to which a transmission resource has not been allocated yet. The first link is an access link.

In one embodiment, before the second radio access network node in the second-type radio access network node generates the resource configuration information, the second radio access network node may receive identification information sent by the first radio access network node or a previous-hop radio access network node accessed by the first radio access network node by using each hop of first-type radio access network node between the second radio access network node and the first radio access network node or the previous-hop radio access network node accessed by the first radio access network node. Further, the second radio access network node determines group attribute information of the first radio access network node based on the identification information, where the group attribute information includes a combination of any one or more pieces of the following information: a group index of the first radio access network node, a quantity of hops of the first radio access network node, and parity of the quantity of hops of the first radio access network node.

The second radio access network node is a donor base station accessed by the first radio access network node.

In one embodiment, the resource configuration information includes local resource configuration information. The second radio access network node determines, based on the group attribute information, a transmission resource group used in the second link of the first radio access network node. Then, the second radio access network node determines that a resource indicated by one group of resource information corresponding to the transmission resource group that is used in the second link and that is included in the global resource configuration information is the transmission resource used in the second link of the first radio access network node. Next, the second radio access network node determines that a resource indicated by the transmission resource information that is used in the first link and that is included in the global resource configuration information is transmission resource information used in the first link of the first radio access network node. Subsequently, the second radio access network node determines that transmission resource information used in the first link of the first radio access network node and transmission resource information used in the second link of the first radio access network node are the local resource configuration information.

The first radio access network node is an RN that has accessed a network but to which a resource has not been allocated yet. The second radio access network node is a donor base station accessed by the first radio access network node. The first link is an access link. The second link is a backhaul link.

By using the method, the second radio access network node may obtain information about a quantity of hops of the first radio access network node in an access process of the first radio access network node, determine the group attribute information based on the information about the quantity of hops, and further, generate local resource configuration information of the first radio access network node based on the group attribute information and the global resource configuration information. Further, the first radio access network node may directly determine, based on local resource configuration information, the transmission resource used in the first link of the first radio access network node and the transmission resource used in the second link of the first radio access network node. The second radio access network node allocates, to the neighboring-hop first radio access network node, a transmission resource different from the transmission resource used in the second link of the second radio access network node, so that the neighboring-hop first radio access network node transmits data on a different resource, thereby avoiding interference between RNs. In this way, resources are properly allocated to a plurality of hops of RNs in a multi-hop RN deployment scenario.

In one embodiment, a boundary of an uplink subframe in the transmission resource used in the second link of the first radio access network node is aligned with a boundary of a downlink subframe in a transmission resource used in a second link of a neighboring-hop first-type radio access network node, and a boundary of a downlink subframe in the transmission resource used in the second link of the first radio access network node is aligned with a boundary of an uplink subframe in the transmission resource used in the second link of the neighboring-hop first-type radio access network node.

According to a third aspect, an embodiment of this application provides a resource allocation method. The method includes: receiving, by a first radio access network node in a first-type radio access network node from a second radio access network node in a second-type radio access network node, local resource configuration information of the first radio access network node and local resource configuration information of a next-hop radio access network node accessing the first radio access network node, where the local resource configuration information of the first radio access network node includes transmission resource information used in a first link of the first radio access network node and transmission resource information used in a second link of the first radio access network node, the local resource configuration information of the next-hop radio access network node includes transmission resource information used in a first link of the next-hop radio access network node and transmission resource information used in a second link of the next-hop radio access network node, and a resource indicated by the transmission resource information that is used in the second link and that is included in the local resource configuration information of the first radio access network node is different from a resource indicated by the transmission resource information that is used in the second link and that is included in the local resource configuration information of the next-hop radio access network node.

Then, the first radio access network node uses the resource indicated by the transmission resource information that is used in the first link and that is included in the local resource configuration information of the first radio access network node as a resource used in the first link of the first radio access network node, and uses the resource indicated by the transmission resource information used in the second link as a resource used in the second link of the first radio access network node. The first radio access network node sends the local resource configuration information of the next-hop radio access network node to the next-hop radio access network node.

The first-type radio access network node is an RN. The first radio access network node is an RN that has accessed a network but to which a resource has not been allocated yet. The second-type radio access network node is a donor base station. The second radio access network node is a donor base station accessed by the first radio access network node.

By using the method, the first radio access network node may directly determine, based on the local resource configuration information sent by the second radio access network node, a transmission resource that may be used in the first link of the first radio access network node and a transmission resource that may be used in the second link of the first radio access network node. Because the resource indicated by the transmission resource information that is used in the second link and that is included in the resource configuration information of the first radio access network node is different from the resource indicated by the transmission resource information that is used in the second link and that is included in the resource configuration information of the next-hop radio access network node, a case in which neighboring-hop first-type radio access network nodes use a same second link resource does not occur. Further, a problem that a previous-hop radio access network node cannot provide a data backhaul service for the first radio access network node because the first radio access network node and a backhaul link of the previous-hop radio access network node accessed by the first radio access network node use a same transmission resource can be avoided.

In one embodiment, the resource indicated by the transmission resource information that is used in the first link and that is included in the local resource configuration information of the first radio access network node is the same as the resource indicated by the transmission resource information that is used in the first link and that is included in the local resource configuration information of the next-hop radio access network node; or the resource indicated by the transmission resource information that is used in the second link and that is included in the local resource configuration information of the first radio access network node is all or a part of the resource indicated by the transmission resource information that is used in the first link and that is included in the local resource configuration information of the next-hop radio access network node.

According to a fourth aspect, an embodiment of this application provides a resource allocation method. The method includes: sending, by a second radio access network node in a second-type radio access network node, local resource configuration information of a first radio access network node and local resource configuration information of a next-hop radio access network node accessing the first radio access network node to a first-type radio access network node in the first-type radio access network node, where the local resource configuration information of the first radio access network node includes transmission resource information used in a first link of the first radio access network node and transmission resource information used in a second link of the first radio access network node, the local resource configuration information of the next-hop radio access network node includes transmission resource information used in a first link of the next-hop radio access network node and transmission resource information used in a second link of the next-hop radio access network node, and a resource indicated by the transmission resource information that is used in the second link and that is included in the local resource configuration information of the first radio access network node is different from a resource indicated by the transmission resource information that is used in the second link and that is included in the local resource configuration information of the next-hop radio access network node.

The first-type radio access network node is an RN. The first radio access network node is an RN that has accessed a network but to which a resource has not been allocated yet. The second-type radio access network node is a donor base station. The second radio access network node is a donor base station accessed by the first radio access network node.

By using the method, because the resource indicated by the transmission resource information that is used in the second link and that is included in the resource configuration information of the first radio access network node generated by the second radio access network node is different from the resource indicated by the transmission resource information that is used in the second link and that is included in the resource configuration information of the next-hop radio access network node, a case in which neighboring-hop first-type radio access network nodes use a same second link resource does not occur. Further, a problem that a previous-hop radio access network node cannot provide a data backhaul service for the first radio access network node because the first radio access network node and a backhaul link of the previous-hop radio access network node accessed by the first radio access network node use a same transmission resource can be avoided.

In one embodiment, the resource indicated by the transmission resource information that is used in the first link and that is included in the local resource configuration information of the first radio access network node is the same as the resource indicated by the transmission resource information that is used in the first link and that is included in the local resource configuration information of the next-hop radio access network node; or the resource indicated by the transmission resource information that is used in the second link and that is included in the local resource configuration information of the first radio access network node is all or a part of the resource indicated by the transmission resource information that is used in the first link and that is included in the local resource configuration information of the next-hop radio access network node.

According to a fifth aspect, an embodiment of this application provides a resource allocation apparatus. The apparatus may implement the resource allocation method performed by the first radio access network node according to the first aspect. For example, the apparatus may be an RN, and the RN may implement the foregoing method by using software, hardware, or hardware executing corresponding software.

In one embodiment, the apparatus may include a processor and a memory. The processor is configured to support the apparatus in executing a corresponding function in the method according to the first aspect. The memory is configured to be coupled to the processor and stores a program (instruction) and data that are necessary for the apparatus. In addition, the apparatus may further include a communications interface, configured to support communication between the apparatus and another network element. The communications interface may be a transceiver.

According to a sixth aspect, an embodiment of this application provides a resource allocation apparatus. The apparatus may implement the resource allocation method performed by the second radio access network node according to the second aspect. For example, the apparatus may be a donor base station, and the donor base station may implement the foregoing method by using software, hardware, or hardware executing corresponding software.

In one embodiment, the apparatus may include a processor and a memory. The processor is configured to support the apparatus in executing a corresponding function in the method according to the second aspect. The memory is configured to be coupled to the processor and stores a program (instruction) and data that are necessary for the apparatus. In addition, the apparatus may further include a communications interface, configured to support communication between the apparatus and another network element. The communications interface may be a transceiver.

According to a seventh aspect, an embodiment of this application provides a resource allocation apparatus. The apparatus may implement the resource allocation method performed by the first radio access network node according to the third aspect. For example, the apparatus may be an RN, and the RN may implement the foregoing method by using software, hardware, or hardware executing corresponding software.

In one embodiment, the apparatus may include a processor and a memory. The processor is configured to support the apparatus in executing a corresponding function in the method according to the third aspect. The memory is configured to be coupled to the processor and stores a program (instruction) and data that are necessary for the apparatus. In addition, the apparatus may further include a communications interface, configured to support communication between the apparatus and another network element. The communications interface may be a transceiver.

According to an eighth aspect, an embodiment of this application provides a resource allocation apparatus. The apparatus may implement the resource allocation method performed by the second radio access network node according to the fourth aspect. For example, the apparatus may be a donor base station, and the donor base station may implement the foregoing method by using software, hardware, or hardware executing corresponding software.

In one embodiment, the apparatus may include a processor and a memory. The processor is configured to support the apparatus in executing a corresponding function in the method according to the second aspect. The memory is configured to be coupled to the processor and stores a program (instruction) and data that are necessary for the apparatus. In addition, the apparatus may further include a communications interface, configured to support communication between the apparatus and another network element. The communications interface may be a transceiver.

According to a ninth aspect, an embodiment of this application a communications system. The system includes the first radio access network node, the various hops of first-type radio access network nodes, the second radio access network node, and the terminal device according to the foregoing aspects.

According to a tenth aspect, an embodiment of this application provides a computer-readable storage medium. The computer-readable storage medium is applied to a first radio access network node. The computer-readable storage medium stores an instruction. When the instruction is run on a computer, the computer is enabled to perform the method according to the first aspect.

According to an eleventh aspect, an embodiment of this application provides a computer program product including an instruction. When the computer program product is run on a computer, the computer is enabled to perform the method according to the first aspect.

According to a twelfth aspect, an embodiment of this application provides a computer-readable storage medium. The computer-readable storage medium is applied to a second radio access network node. The computer-readable storage medium stores an instruction. When the instruction is run on a computer, the computer is enabled to perform the method according to the second aspect.

According to a thirteenth aspect, an embodiment of this application provides a computer program product including an instruction. When the computer program product is run on a computer, the computer is enabled to perform the method according to the second aspect.

According to a fourteenth aspect, an embodiment of this application provides a computer-readable storage medium. The computer-readable storage medium is applied to a first radio access network node. The computer-readable storage medium stores an instruction. When the instruction is run on a computer, the computer is enabled to perform the method according to the third aspect.

According to a fifteenth aspect, an embodiment of this application provides a computer program product including an instruction. When the computer program product is run on a computer, the computer is enabled to perform the method according to the third aspect.

According to a sixteenth aspect, an embodiment of this application provides a computer-readable storage medium. The computer-readable storage medium is applied to a second radio access network node. The computer-readable storage medium stores an instruction. When the instruction is run on a computer, the computer is enabled to perform the method according to the fourth aspect.

According to a seventeenth aspect, an embodiment of this application provides a computer program product including an instruction. When the computer program product is run on a computer, the computer is enabled to perform the method according to the fourth aspect.

According to an eighteenth aspect, an embodiment of this application provides a chip system. The chip system is applied to a first radio access network node. The chip system includes at least one processor, a memory, and an interface circuit. The memory, the interface circuit, and the at least one processor are connected to each other by using a line, the at least one memory stores an instruction, and the processor executes the instruction, to perform an operation of the first radio access network node in the method according to the first aspect.

According to a nineteenth aspect, an embodiment of this application provides a chip system. The chip system is applied to a second radio access network node. The chip system includes at least one processor, a memory, and an interface circuit. The memory, the interface circuit, and the at least one processor are connected to each other by using a line, the at least one memory stores an instruction, and the processor executes the instruction, to perform an operation of the second radio access network node in the method according to the second aspect.

According to a twentieth aspect, an embodiment of this application provides a chip system. The chip system is applied to a first radio access network node. The chip system includes at least one processor, a memory, and an interface circuit. The memory, the interface circuit, and the at least one processor are connected to each other by using a line, the at least one memory stores an instruction, and the processor executes the instruction, to perform an operation of the first radio access network node in the method according to the third aspect.

According to a twenty-first aspect, an embodiment of this application provides a chip system. The chip system is applied to a second radio access network node. The chip system includes at least one processor, a memory, and an interface circuit. The memory, the interface circuit, and the at least one processor are connected to each other by using a line, the at least one memory stores an instruction, and the processor executes the instruction, to perform an operation of the second radio access network node in the method according to the fourth aspect.

Compared with the prior art, in this application, the first radio access network node may determine, based on the received resource configuration information, the transmission resource used in the second link of the first radio access network node. The resource indicated by one group of resource information in the resource configuration information is the transmission resource used in the second link of the first radio access network node, and the resource indicated by the other group of resource information is the transmission resource used in the second link of the next-hop radio access network node accessing the first radio access network node. Therefore, transmission resources used in second links of neighboring-hop radio access network nodes are different, and a case in which the first radio access network node and a previous-hop radio access network node use a same backhaul link resource does not occur. In this way, a problem that the previous-hop radio access network node cannot provide a data backhaul service for the first radio access network node because the first radio access network node and a backhaul link of the previous-hop radio access network node accessed by the first radio access network node use a same transmission resource can be avoided.

DESCRIPTION OF EMBODIMENTS

A system architecture and a service scenario described in this application aim to more clearly describe the technical solutions in this application, but are not intended to limit the technical solutions provided in this application. A person of ordinary skill in the art may know that as the system architecture evolves and a new service scenario emerges, the technical solutions provided in this application further apply to a similar technical problem.

It should be noted that, in this application, the word "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example" or "for example" or the like is intended to present a relative concept in a specific manner.

It should be noted that, in the embodiments of this application, "of" and "corresponding (English corresponding)" may be interchangeably used sometimes. It should be noted that, consistent meanings are expressed when differences are not emphasized.

Before the technical solutions of this application are described in detail, for ease of understanding, a scenario to which the embodiments of this application are applied is described first.

Figure 1:
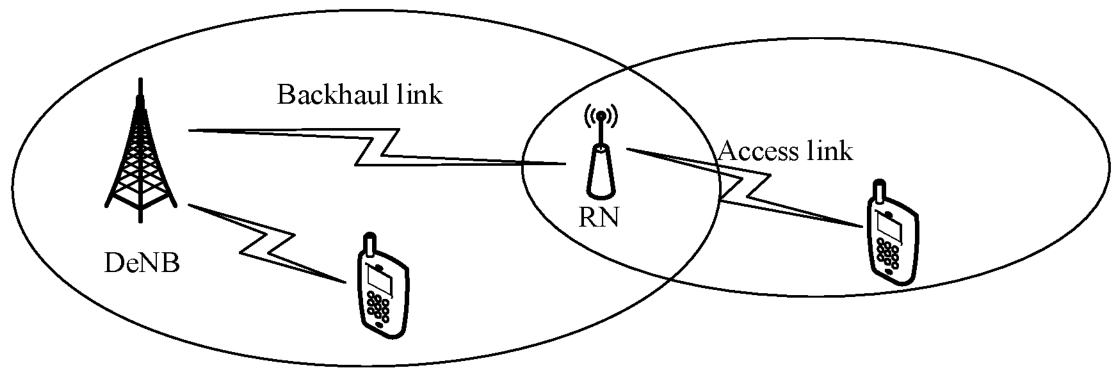
FIG. 1 is a schematic structural diagram of a communications system in the background.
Figure 2:
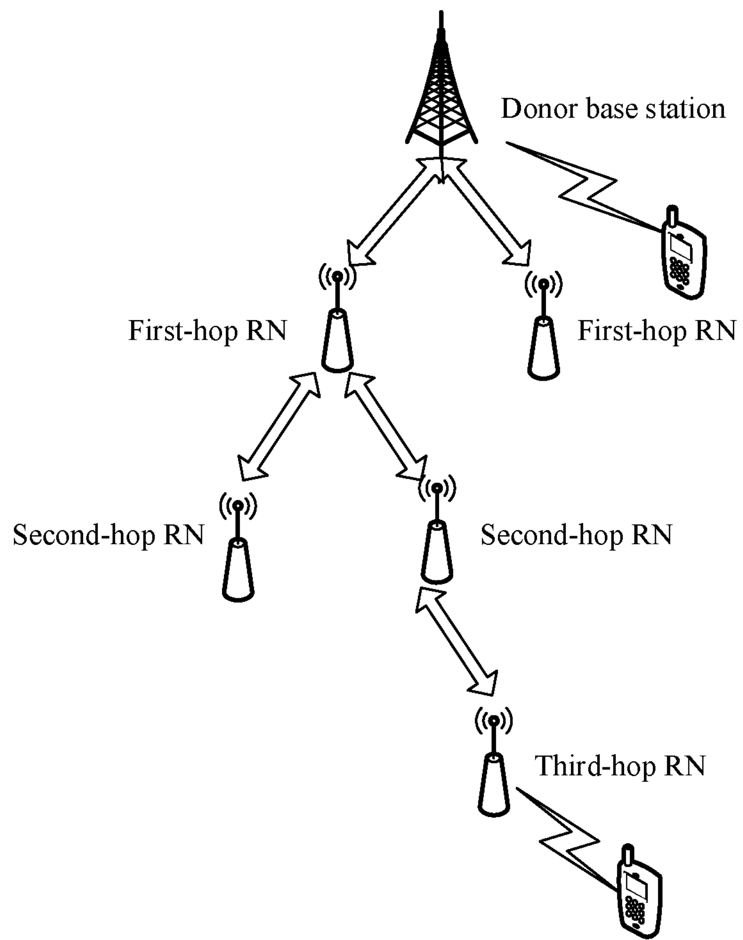
FIG. 2 is a schematic structural diagram of a communications system according to an embodiment of this application.

The embodiments of this application are applied to a communications system shown in FIG. 2, and the system includes a donor base station, an RN, and UE. A communications link between the RN and the UE is referred to as an access link. A communications link between the RN and the donor base station and a communications link between various stages of RNs are referred to as backhaul links.

A resource allocation method provided in this application may be applied to the communications system. The communications system includes a terminal device, a radio access network device as a donor base station, a radio access network device as a relay node, and the like.

The radio access network device in this application may also be referred to as a base station in a wireless communications standard. In most scenarios, the radio access network device is an apparatus that is deployed in a radio access network and that is configured to provide a wireless communication function for a terminal device. The radio access network device in this application includes, but is not limited to, various forms of macro base stations, micro base stations (also referred to as small cells), relay stations, and transmission reception points (TRP), a next generation network node (gNodeB, gNB), an evolved NodeB (eNB), an evolved node B (ng-eNB) connected to a next generation core network, a radio network controller (RNC), a NodeB (NB), a base station controller (BSC), a base transceiver station (BTS), a home base station (for example, a home evolved NodeB or home NodeB, HNB), a baseband unit (BBU) processing communication data, a base station node in a future evolved network or a new network, and the like, and may further include a radio access network device of a non-third-generation partnership project (3GPP) system, such as a wireless local area network (WLAN) access device. In systems using different radio access technologies, names of radio access network devices with similar wireless communication functions may be different. For ease of description, in the embodiments of this application, the foregoing apparatuses that may provide a wireless communication function for the terminal device are collectively referred to as a radio access network device.

The terminal device in this application is a device with a wireless transceiver function, and the terminal device may be deployed on land. For example, the terminal device may be an indoor device, an outdoor device, a handheld device, or a vehicle-mounted device. Alternatively, the terminal device may be deployed on water (for example, on a ship), or may be deployed in the air (for example, on a plane, a balloon, or a satellite). The terminal device may include various types of mobile phones, tablet computers (Pads), computers with wireless receiving and sending functions, wireless data cards, virtual reality (VR) terminal devices, augmented reality (AR) terminal devices, and machine type communication (MTC) terminal devices, terminal devices in industrial control, terminal devices in self driving, terminal devices in remote medical, terminal devices in smart grid, terminal devices in transportation safety, terminal devices in smart city, and smart households (home devices having a wireless communication function, such as a refrigerator, a television, a washing machine, and furniture), wearable devices (such as a smart watch, a smart band, and a step counter), and the like. Alternatively, the terminal device in this application may be a device that is disposed in a fixed position and that has a wireless communication function similar to that of the foregoing terminal device. In systems using different radio access technologies, names of terminal devices with similar wireless communication functions may be different. Merely for ease of description, in the embodiments of this application, the foregoing apparatuses with a wireless transceiver communication function are collectively referred to as a terminal device.

FIG. 2 is a schematic structural diagram of the communications system. The communications system includes a donor base station, an RN, and a terminal device. The donor base station is a communication site that has a capability of providing services such as data transmission for the RN. A communications link between the RN and the donor base station and a communications link between various stages of RNs are referred to as backhaul links, and a link between the RN and the terminal device is referred to as an access link.

A plurality of RNs may be directly connected to a same donor base station through backhaul links, and the RNs may alternatively access the donor base station in a cascading manner. For ease of description, the RN directly connected to the donor base station is referred to as a first-hop RN, and the RN that accesses the donor base station by using the first-hop RN is referred to as a second-hop RN. Similarly, the RN connected to the second-hop RN is referred to as a third-hop RN. Sequentially, there may further be a fourth-hop RN, and a fifth-hop RN to an $N^{th}$-hop RN. In addition, both the donor base station and the RN may communicate with the terminal device. The RN may provide a wireless data transmission service for the terminal device. The RN may transmit data to the terminal device through an access link and transmit data to the donor base station through a backhaul link.

It should be noted that, FIG. 2 is merely a schematic structural diagram of a communications system to which this application is applied. During actual deployment, a quantity of devices in the communications system is not limited to a quantity of devices shown in FIG. 2.

In the prior art, LTE R10 supports only a single-hop RN deployment scenario. In the single-hop RN scenario, an access subframe may be allocated to an access link, and a relay subframe may be allocated to a backhaul link. However, in a multi-hop RN scenario, if a plurality of hops of RNs all use a same relay subframe, for an intermediate-hop RN (that is, a plurality of subsequent hops of RNs need to access a donor base station by using the intermediate-hop RN), not only a backhaul link of the intermediate-hop RN needs to be maintained on the relay subframe, but also data needs to be transmitted to the plurality of subsequent hops of RNs on the relay subframe. High requirements are imposed on a hardware capability of the intermediate-hop RN, and moreover, processing complexity and hardware costs of the RN are increased. Therefore, this is not a preferable solution.

Therefore, to implement deployment of a plurality of hops of RNs, increase resource multiplexing efficiency, and avoid a conflict between relay subframes of the plurality of RNs, principles of this application are: Wireless transmission resources are divided into backhaul link resources and access link resources. Each RN and each donor base station transmit data through a same access link, and then the backhaul link resources are divided into a plurality of groups. A neighboring-hop RN may transmit data on a different group of backhaul link resources.

Figure 3:
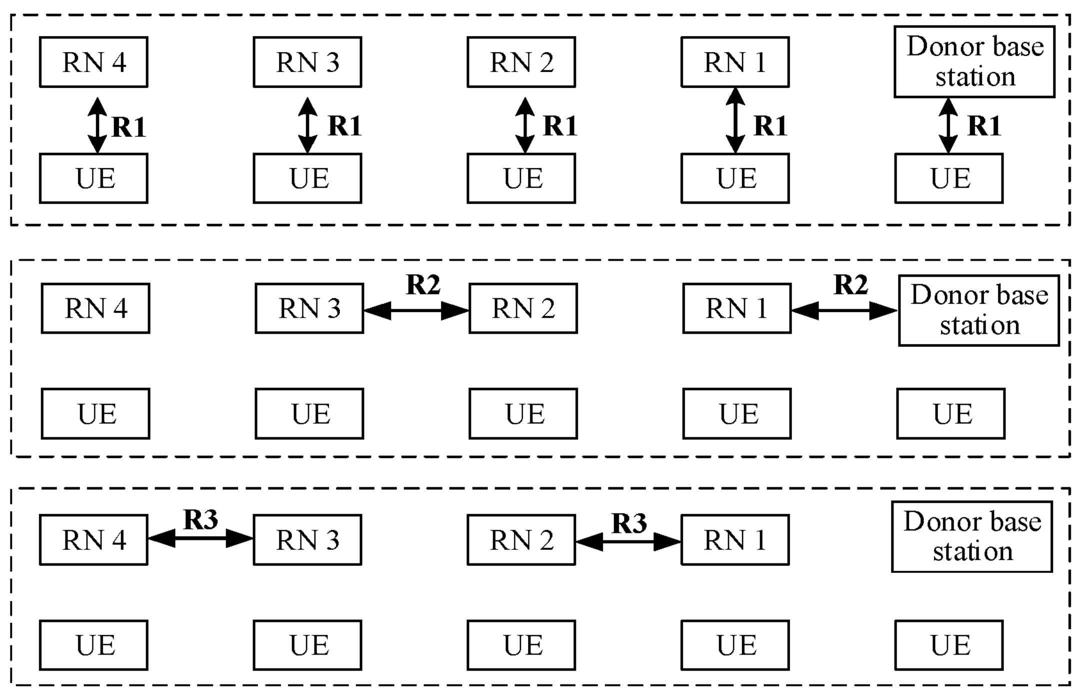
FIG. 3 is a schematic diagram of an example of a resource allocation method according to an embodiment of this application.

For example, as shown in FIG. 3, an RN 1, an RN 2, an RN 3, and an RN 4 are a first-hop RN to a fourth-hop RN respectively, where the RN 1 is directly connected to a donor base station, the RN 2 is connected to the RN 1, the RN 3 is connected to the RN 2, the RN 4 is connected to the RN 3, and a terminal device accesses each RN. The donor base station may allocate a resource to each RN in a time division multiplexing manner. For example, if R1 is an access link resource, and R2 and R3 are relay link resources, each RN transmits data to the terminal device by using R1, an odd-hop RN performs data backhaul by using R2, and an even-hop RN performs data backhaul by using R3. Deployment of the plurality of hops of RNs can be implemented in this resource allocation mode, and because neighboring RNs use different wireless transmission resources, interference between the RNs is avoided, and the RNs do not need to have a multi-hop radio frequency transceiver apparatus and a complex intra-device interference processing unit.

Figure 4:
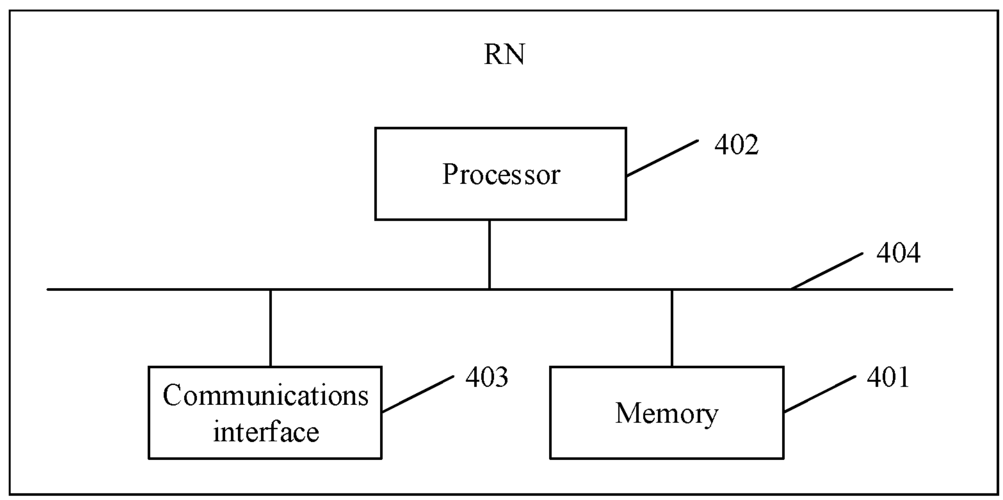
FIG. 4 is a schematic structural diagram of an RN according to an embodiment of this application.

In the embodiments of this application, a structure of the RN in FIG. 2 and FIG. 3 is shown in FIG. 4. The RN may include a memory 401, a processor 402, a communications interface 403, and a bus 404. The bus 404 is configured to implement a connection and mutual communication between these apparatuses.

The communications interface 403 may be implemented by using an antenna, and may be configured to exchange data with an external network element. For example, the communications interface 403 of the RN may receive/send a data packet or other information from/to a terminal device, another RN, and a donor base station.

The processor 402 may be a central processing unit (CPU), or an application-specific integrated circuit (ASIC), or one or more integrated circuits configured to implement the embodiments of the present invention, for example, one or more microprocessors (DSP) or one or more field programmable gate arrays (FPGA). The processor 402 has a processing and management function. In one embodiment, the processor 402 in the RN may process received data or information sent by the terminal device, the RN, or the donor base station, or process information or data sent by another device.

The memory 401 may be a read-only memory (ROM) or another type of static storage device that is capable of storing static information and a static instruction, a random access memory (RAM) or another type of dynamic storage device that is capable of storing information and an instruction. The memory 401 may alternatively be an electrically erasable programmable read-only memory (EEPROM), a compact disc read-only memory (CD-ROM), or another compact disc storage, an optical disc storage (which includes a compact disc, a laser disc, an optical disc, a digital versatile disc, a Blu-ray disc, and the like), a magnetic disk storage medium or another magnetic storage device, or any other medium that can be used to carry or store expected program code having an instruction or a data structure form and that can be accessed by a computer. However, this is not limited herein. The memory 401 may exist independently, and is connected to the processor 402 by using the bus 404. Alternatively, the memory 401 may be integrated into the processor 402.

Figure 5:
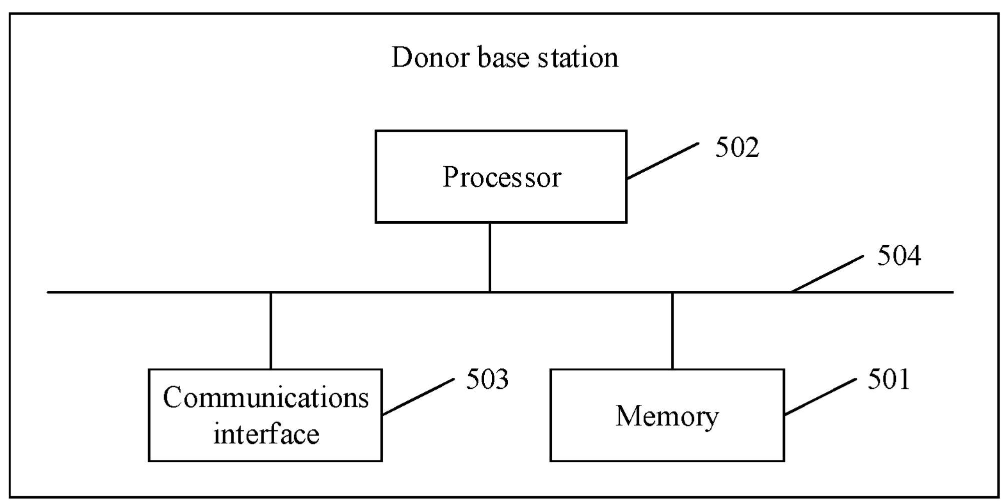
FIG. 5 is a schematic structural diagram of a donor base station according to an embodiment of this application.

In addition, a structure of the donor base station in FIG. 2 and FIG. 3 is shown in FIG. 5. The donor base station may include a memory 501, a processor 502, a communications interface 503, and a bus 504. The bus 504 is configured to implement a connection and mutual communication between these apparatuses.

The communications interface 503 may be implemented by using an antenna, and may be configured to exchange data with an external network element. For example, the communications interface 503 of the donor base station may receive/send a data packet or other information from/to a terminal device and an RN.

The processor 502 may be a central processing unit (CPU), or an application-specific integrated circuit (ASIC), or one or more integrated circuits configured to implement the embodiments of the present invention, for example, one or more microprocessors (DSP) or one or more field programmable gate arrays (FPGA). The processor 502 has a processing and management function. In one embodiment, the processor 502 in the donor base station may process received data or information sent by the terminal device or the RN, or process information or data sent by another device.

The memory 501 may be a read-only memory (ROM) or another type of static storage device that is capable of storing static information and a static instruction, a random access memory (RAM) or another type of dynamic storage device that is capable of storing information and an instruction. The memory 501 may alternatively be an electrically erasable programmable read-only memory (EEPROM), a compact disc read-only memory (CD-ROM), or another compact disc storage, an optical disc storage (which includes a compact disc, a laser disc, an optical disc, a digital versatile disc, a Blu-ray disc, and the like), a magnetic disk storage medium or another magnetic storage device, or any other medium that can be used to carry or store expected program code having an instruction or a data structure form and that can be accessed by a computer. However, this is not limited herein. The memory 501 may exist independently, and is connected to the processor 502 by using the bus 504. Alternatively, the memory 501 may be integrated into the processor 502.

With reference to the communications system and the donor base station shown in FIG. 2 to FIG. 4, the resource allocation method provided in this application is described below in detail.

First, terms used in the embodiments of this application are briefly described, to facilitate understanding.

(1) First-Type Radio Access Network Node and Second-Type Radio Access Network Node The first-type radio access network node is an RN. A first radio access network node is an RN that has accessed a network but to which a wireless transmission resource has not been allocated yet, for example, may be a hop of RN accessing a communications system, or may be an RN accessing a donor base station.

The second-type radio access network node is a donor base station. A second radio access network node is a donor base station accessed by the first radio access network node.

(2) Transmission Resource Used in a First Link and Transmission Resource Used in a Second Link The transmission resource used in the first link is a set of wireless transmission resources that may be used by a donor base station or an RN to transmit data in an access link. The donor base station or the RN may schedule all or some resources in the set to transmit data to UE. Transmission resource information used in the first link is information used to indicate or derive the transmission resource used in the first link. The first link may be an access link. Correspondingly, the transmission resource used in the first link may be an access link resource.

The transmission resource used in the second link is a set of wireless transmission resources that may be used by an RN to transmit data in a backhaul link. A communication site accessed by the RN may schedule all or some resources in the set to transmit data to the RN. Transmission resource information used in the second link is information used to indicate or derive the transmission resource used in the second link. The second link may be a backhaul link. Correspondingly, the transmission resource used in the second link may be a backhaul link resource.

Allocation of the access link resource and the backhaul link resource may include the following two cases:

Case 1: An air interface of the first link is different from that of the second link, the transmission resources used by first links of a donor base station and various hops of RNs are the same, and the transmission resources used by second links of neighboring-hop RNs are different.

Figure 6:
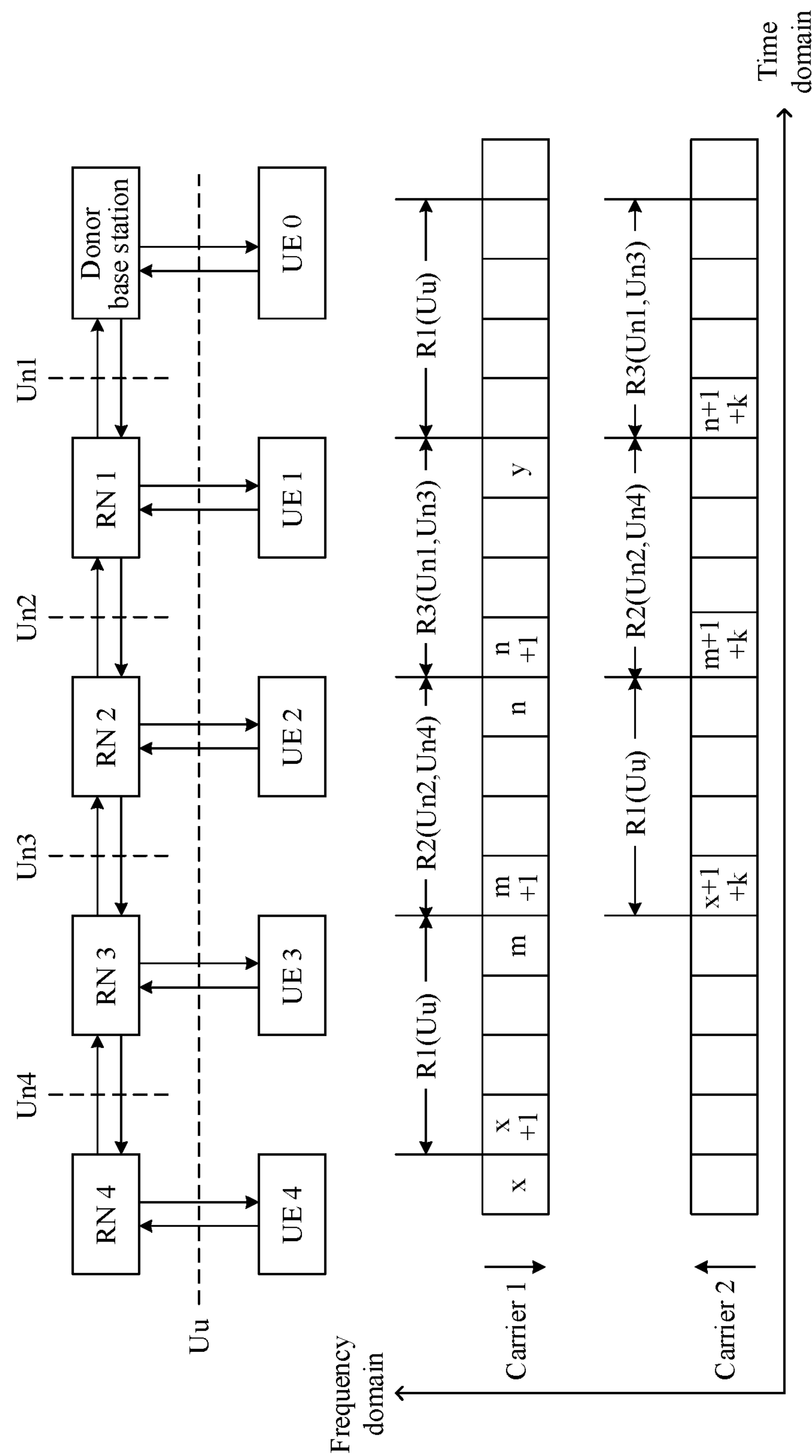
FIG. 6 is a schematic diagram of an example of a resource allocation method according to an embodiment of this application.

For example, as shown in FIG. 6, an RN 4 communicates with an RN 3 through a Un4 interface, the RN 3 communicates with an RN 2 through a Un3 interface, the RN 2 communicates with an RN 1 through a Un2 interface, and the RN 1 communicates with a donor base station through a Un1 interface. Un4, Un3, Un2, and Un1 use a same air interface mechanism, but may use a same resource or different resources. UE 4, UE 3, UE 2, UE 1, and UE 0 respectively communicate with the RN 4, the RN 3, the RN 2, the RN 1, and the donor base station through a Uu interface. The Uu interface uses an air interface mechanism different from that used by Un4, Un3, Un2, and Un1, and uses a radio resource different from that used by Un4, Un3, Un2, and Un1.

It should be noted that, that air interface mechanisms of two links are the same in this embodiment of this application may mean that physical layer technologies used by the two links to receive and send data are the same or mostly the same, and protocol stack functions and processing procedures above a physical layer may be different.

As shown in FIG. 6, an FDD system is used as an example. A carrier 1 is used for downlink transmission. It is assumed that one resource period is a subframe [x+1, y]. In the downlink carrier 1, [x+1, m] is a resource group R1, [m+1, n] is a resource group R2, and [n+1, y] is a resource group R3. A carrier 2 is used for uplink transmission. In one embodiment, there is a correspondence between a resource group of the carrier 2 and a resource group of a downlink carrier. For example, a difference in a quantity of subframes between a resource group of an uplink carrier and a carrier resource group of a corresponding downlink is k. In the uplink carrier 2, [x+1+k, m+k] is a resource group R1, [m+1+k, n+k] is a resource group R2, and [n+1+k, y+k] is a resource group R3. The value of the k may be specified in a protocol or configured by a donor base station. For example, in the downlink carrier 1 and the uplink carrier 2, R1 may be used as access link resources, R2 may be used as backhaul link resources of an even group of RNs, and R3 may be used as backhaul link resources of an odd group of RNs.

Further, in one embodiment, a boundary of an uplink subframe in the transmission resource used in the second link of the first radio access network node is aligned with a boundary of a downlink subframe in a transmission resource used in a second link of a neighboring-hop first-type radio access network node, and a boundary of a downlink subframe in the transmission resource used in the second link of the first radio access network node is aligned with a boundary of an uplink subframe in the transmission resource used in the second link of the neighboring-hop first-type radio access network node.

For example, a boundary of R2 in the downlink carrier 1 is aligned with a boundary of R1 in the uplink carrier 2, so that the RN 2 can receive both data sent by the UE 2 through the Uu interface by using R1 in the uplink carrier 2 and data sent by the RN 1 through the Un2 interface by using R2 in the downlink carrier 1. Processing of another even-hop RN is similar to that of the RN 2, so that the RN 2 may use only one set of receiving devices, and receive data through both the Uu interface and the Un2 interface, thereby reducing hardware costs of the devices. Similarly, a boundary of R3 in the downlink carrier 1 is aligned with the boundary of R2 in the uplink carrier 2, so that the RN 1 can receive data sent by the RN 2 through the Un2 interface by using R2 in the uplink carrier 2 and data sent by the donor base station through the Un1 interface by using R3 in the downlink carrier 1. Processing of another odd-hop RN is similar to that of the RN 1.

It should be noted that, if the subframe [x+1, y] is the first resource period, in the second resource period, the boundary of R1 in the downlink carrier 1 is also aligned with the boundary of R3 in the uplink carrier 2 in the first resource period. In one embodiment, the subframe alignment manner may be implemented by making a quantity of R1 subframes, a quantity of R2 subframes, a quantity of R3 subframes, and the value of k the same. It should be noted that, this manner is merely an example, and another resource allocation manner is not excluded, so that an RN node may receive data of at least two links and/or send data of at least two links.

Case 2: An air interface of the first link is the same as that of the second link. Transmission resources used in second links of neighboring-hop first radio access network nodes are different. A transmission resource used in a first link of the first radio access network node may be the same as a transmission resource used in a second link of a next-hop first-type radio access network node, or a transmission resource of a first link of the first radio access network node is a part of a transmission resource used in a second link of a next-hop first-type radio access network node.

The transmission resource used in the first link of the first radio access network node and the transmission resource used in the second link of the next-hop first-type radio access network node may be resources in a same resource set. The first radio access network node may schedule resources in the resource set for the next-hop first-type radio access network node and a terminal device, to prevent the next-hop first-type radio access network node and the terminal device from using a same resource at the same time. For example, in a same period of time, the transmission resource used in the first link of the first radio access network node is some resources in the resource set, and the transmission resource used in the second link of the next-hop first-type radio access network node is other resources in the resource set. Alternatively, in one period of time, the transmission resource used in the first link of the first radio access network node is all resources in the resource set; and in another period of time, the transmission resource used in the second link of the next-hop first-type radio access network node is all resources in the resource set.

When there are a plurality hops of first-type radio access network nodes in the communications system, the first radio access network node in the first-type radio access network node not only needs to receive data through a second link of a next-hop first-type radio access network node, but also needs to send data to the previous-hop first-type radio access network node through the second link of the first radio access network node, and different transmission resources used in second links are allocated to neighboring-hop first-type radio access network nodes, so that data sent by the first radio access network node through the second link of the first radio access network node can be prevented from interfering with data received through the second link of the next-hop radio access network node.

Figure 7:
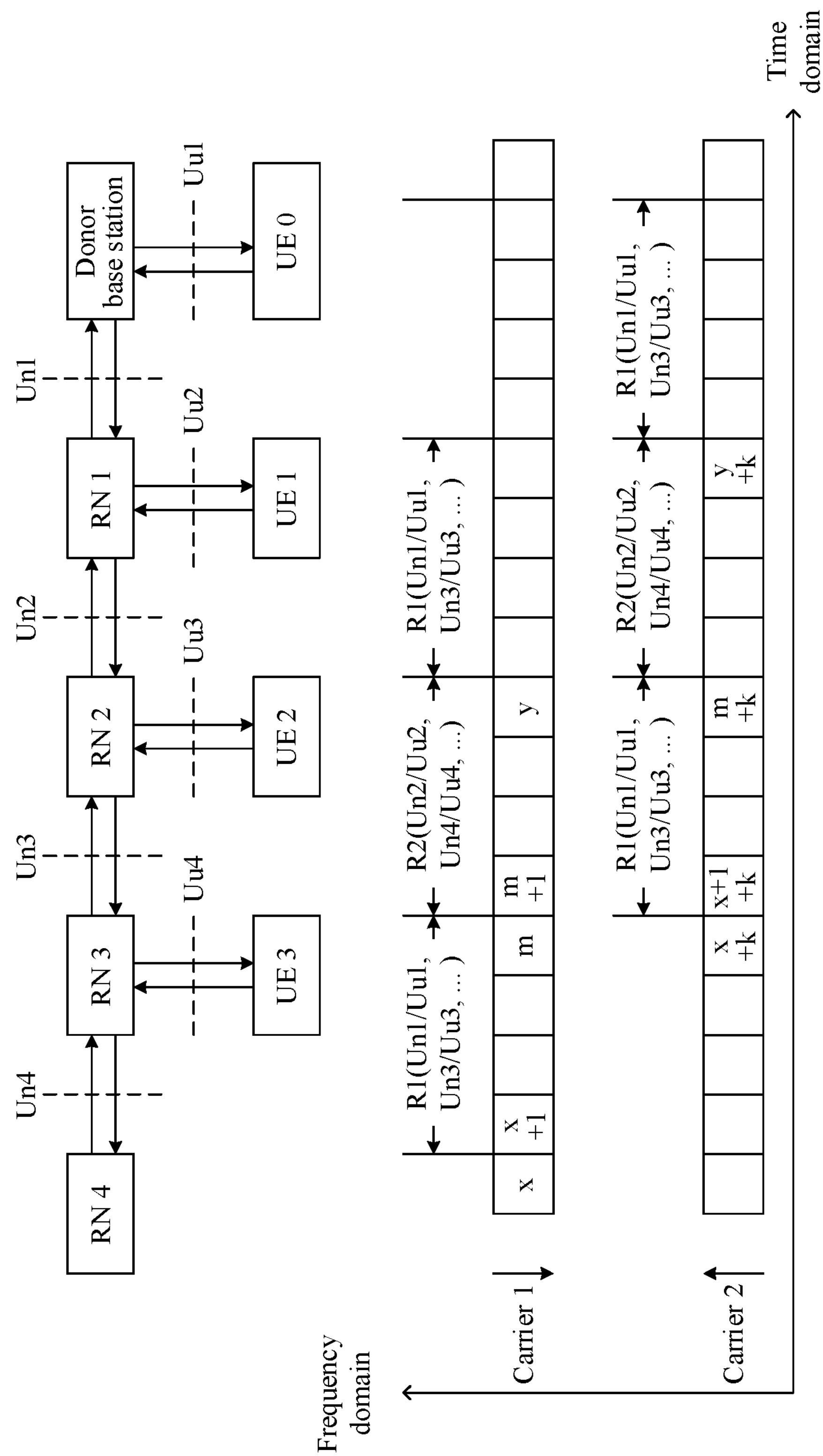
FIG. 7 is a schematic diagram of an example of another resource allocation method according to an embodiment of this application.

For example, as shown in FIG. 7, an RN 4 communicates with an RN 3 through a Un4 interface, the RN 3 communicates with an RN 2 through a Un3 interface, the RN 2 communicates with an RN 1 through a Un2 interface, and the RN 1 communicates with a donor base station through a Un1 interface. UE 3 communicates with the RN 3 through a Uu4 interface, UE 2 communicates with the RN 2 through a Uu3 interface, UE 1 communicates with the RN 1 through a Uu2 interface, and UE 0 communicates with a donor base station through a Uu1 interface. Un4, Un3, Un2, Un1, Uu4, Uu3, Uu2, and Uu1 use a same air interface mechanism, but may use a same resource or different resources.

As shown in FIG. 7, an FDD system is used as an example. A carrier 1 is used for downlink transmission. One resource period is a subframe [x+1, y], [x+1, m] is a resource group R1, and [m+1, y] is a resource group R2. A carrier 2 is used for uplink transmission. In one embodiment, there is a correspondence between a resource group of the carrier 2 and a resource group of a downlink carrier. For example, a difference in a quantity of subframes is k. To be specific, [x+1+k, m+k] is a resource group R1, and [m+1+k, y+k] is a resource group R2. The value of the k may be specified in a protocol or configured by a donor base station. For example, R1 may be used as backhaul link resources of an odd group of RNs, and R2 may be used as backhaul link resources of an even group of RNs. Alternatively, an access link resource used by UE served by each hop of RN may be the same as or a part of a backhaul link resource of a next-hop RN accessing the RN.

In one embodiment, a boundary of an uplink subframe in the transmission resource used in the second link of the first radio access network node is aligned with a boundary of a downlink subframe in a transmission resource used in a second link of a neighboring-hop first-type radio access network node, and a boundary of a downlink subframe in the transmission resource used in the second link of the first radio access network node is aligned with a boundary of an uplink subframe in the transmission resource used in the second link of the neighboring-hop first-type radio access network node.

For example, a boundary of R2 in the downlink carrier 1 is aligned with a boundary of R1 in the uplink carrier 2, and a boundary of R1 in the downlink carrier 1 is aligned with a boundary of R2 in the uplink carrier 2, so that the RN 2 may receive both data (which may be data sent by the UE 2 through Uu3 by using R1 in the uplink carrier 2, if Uu3 also reuses R1) sent by the RN 3 through Un3 by using R1 in the uplink carrier 2 and data sent by the RN 1 through the Un2 interface by using R2 in the downlink carrier 1. In addition, the RN 1 may send data to the RN 2 through Un2 by using R2 in the downlink carrier 1 (if Uu2 also reuses R2, the RN 1 may send data to the UE 1 through Uu2 by using R2 in the downlink carrier 1). At the same time, the RN 1 sends data to the donor base station through the Un1 interface by using R1 in the uplink carrier 2. In this way, the RN 2 can receive data from both the Un3 (or Uu3) interface and the Un2 interface by using only one set of receiving devices; and the RN 1 can send data through both the Un1 interface and the Un2 (or Uu2) interface by using only one set of sending devices, thereby reducing hardware costs of the devices. Receiving processing of another even-hop RN is similar to that of the RN 2, and sending processing of another odd-hop RN is similar to that of the RN 1.

Similarly, if the subframe [x+1, y] is the first resource period, the boundary of R1 in the downlink carrier 1 in the second resource period is aligned with the boundary of R2 in the uplink carrier 2 in the first resource period, so that the RN 1 may receive both data (which may be data sent by the UE 1 through Uu2 by using R2 in the uplink carrier 2, if Uu2 also reuses R2) sent by the RN 2 through the Un2 interface and data sent by the donor base station through the Un1 interface by using R1 in the downlink carrier 1 in the second resource period. In addition, the RN 2 may send data to the RN 3 through Un3 by using R1 in the downlink carrier 1 in the second resource period (if Uu3 also reuses R1, the RN 2 may send data to the UE 2 through Uu3 by using R1 in the downlink carrier 1 in the second resource period). At the same time, the RN 2 sends data to the RN 1 through the Un2 interface by using R2 in the uplink carrier 2. Receiving processing of another odd-hop RN is similar to that of the RN 1, and sending processing of another even-hop RN is similar to that of the RN 2. In one embodiment, the subframe alignment manner may be implemented by making a quantity of R1 subframes, a quantity of R2 subframes, and the value of k the same. It should be noted that, this manner is merely an example, and another resource allocation manner is not excluded, so that an RN node may receive data of at least two links and/or send data of at least two links.

In one embodiment, an access link of the donor base station and a backhaul link used by the first-hop RN accessing the donor base station may use a same resource set. An access link of an RN and an access link used by a next-hop RN accessing the RN may use a same resource set. RNs spaced by one hop use different sets of access link resources.

For example, a wireless transmission resource may correspond to forms such as a time domain resource, a frequency domain resource, and a space domain resource. For example, for an FDD system, the wireless transmission resource may be a subframe resource and/or a beam that are/is of an uplink/downlink carrier; for a TDD system, the wireless transmission resource may be a time-frequency resource block and/or a beam.

(3) Other Terms

In this application, "a plurality of" means two or more than two.

The terms "first", "second", and the like in this specification are merely intended to distinguish between different objects, and do not limit their sequences. For example, the first radio access network node and the second radio access network node are merely intended to distinguish between different radio access network nodes, and do not limit a sequence of the first radio access network node and the second radio access network node.

The term "and/or" in this specification describes only an association relationship for associated objects and represents that three relationships may exist. For example, A and/or B may represent the following three cases: Only A exists, both A and B exist, and only B exists. In addition, the character "/" in this specification generally indicates an "or" relationship between the associated objects. In the formula, the character "/" indicates a "division" relationship between the associated objects.

Figure 8:
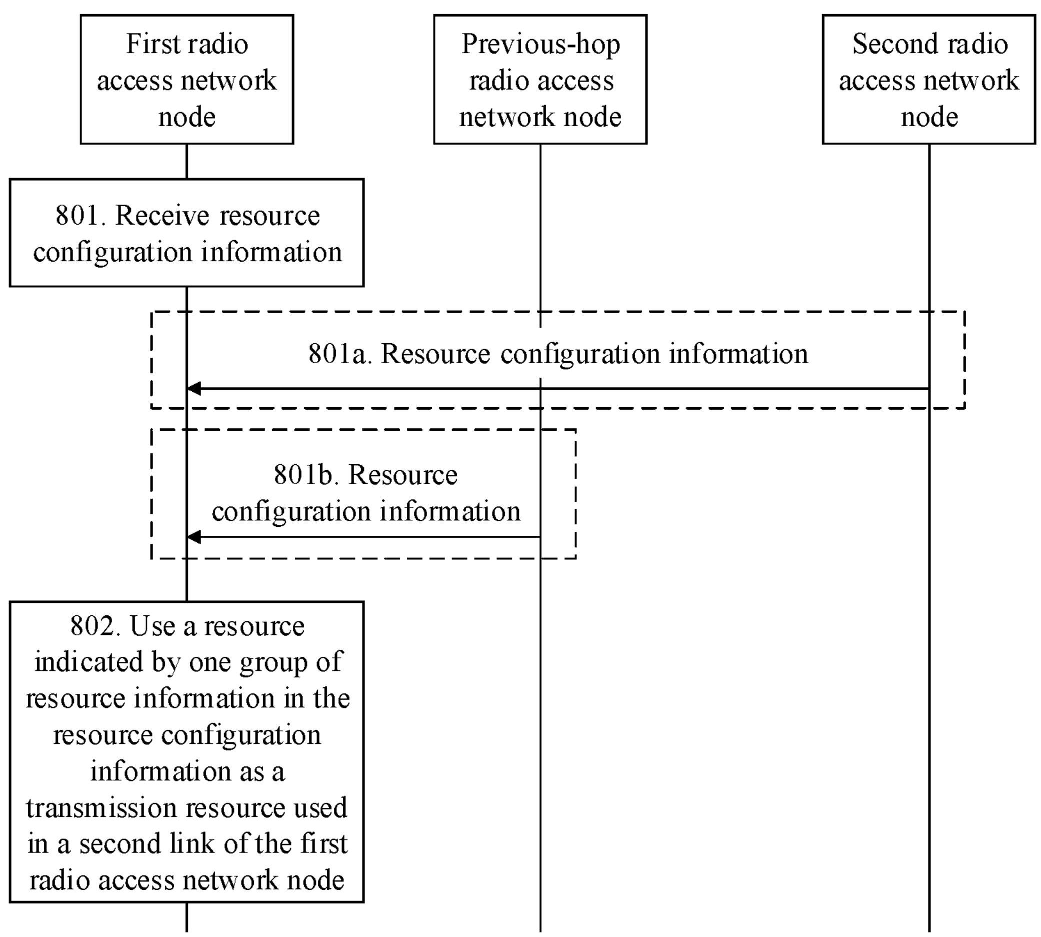
FIG. 8 is a flowchart of another resource allocation method according to an embodiment of this application.

As shown in FIG. 8, an embodiment of this application provides a resource allocation method. The method is applied to the communications system shown in FIG. 2. The method includes the following operations.

801. A first radio access network node in a first-type radio access network node receives resource configuration information.

This operation may be implemented as operation 801*a* or operation 801*b*.

801*a*. The first radio access network node receives resource configuration information from a second radio access network node in a second-type radio access network node. In one embodiment, after receiving the resource configuration information from the second radio access network node, a previous-hop radio access network node sends the resource configuration information to the first radio access network node.

801*b*. The first radio access network node receives resource configuration information from the previous-hop radio access network node accessed by the first radio access network node.

The first-type radio access network node may be an RN, and the first radio access network node in the first-type radio access network node is an RN waiting to be allocated with a wireless transmission resource. The previous-hop radio access network node is an RN accessed by the RN waiting to be allocated with a wireless transmission resource. For example, the first-type radio access network node may be the third-hop RN in FIG. 2, and the previous-hop radio access network node is the second-hop RN accessed by the third-hop RN in FIG. 2. The second radio access network node in the second-type radio access network node is a donor base station accessed by the first radio access network node. For example, the second radio access network node may be the donor base station in FIG. 2.

The resource configuration information includes at least two groups of resource information, a resource indicated by one group of resource information is a transmission resource used in a second link of the first radio access network node, and a resource indicated by the other group of resource information is a transmission resource used in a second link of a next-hop radio access network node accessing the first radio access network node.

A first link is an access link of the first radio access network node, and the access link is a communications link between the first radio access network node and a terminal device. For example, the access link is a communications link between the third-hop RN and the terminal device accessing the third-hop RN in FIG. 2.

The second link is a backhaul link of the first radio access network node. If the first radio access network node is a first-hop first-type radio access network node, the backhaul link is a communications link between the first radio access network node and the second radio access network node. For example, the backhaul link is a communications link between the first-hop RN and the donor base station in FIG. 2. If the first radio access network node is not a first-hop first-type radio access network node, the backhaul link is a communications link between the first radio access network node and the previous-hop radio access network node accessed by the first radio access network node. For example, the backhaul link is a communications link between the third-hop RN and the second-hop RN in FIG. 2.

For example, the transmission resource used in the first link is a resource used in an access link of an RN, and the transmission resource used in the second link is a resource used in a backhaul link of the RN.

It should be noted that, the previous-hop radio access network node or the second radio access network node may send a broadcast message or send dedicated signaling to the first radio access network node. The dedicated signaling may be a radio resource control (RRC) message, and the broadcast message or the dedicated signaling includes resource configuration information.

802. The first radio access network node uses the resource indicated by one group of resource information in the resource configuration information as the transmission resource used in the second link of the first radio access network node.

For example, if the resource configuration information includes two groups of resource information, a resource indicated by one group of resource information is a transmission resource used in a second link of an odd-hop first-type radio access network node, and a resource indicated by the other group of resource information is a transmission resource used in a second link of an even-hop first-type radio access network node, the second link of the first radio access network node may use the resource indicated by one group of resource information, and the next-hop radio access network node uses the resource indicated by the other group of resource information. Transmission resources used by neighboring-hop RNs are different.

By using the resource allocation method provided in this embodiment, the first radio access network node may determine, based on the received resource configuration information, the transmission resource used in the second link of the first radio access network node. The resource indicated by one group of resource information in the resource configuration information is the transmission resource used in the second link of the first radio access network node, and the resource indicated by the other group of resource information is the transmission resource used in the second link of the next-hop radio access network node accessing the first radio access network node. Therefore, transmission resources used in second links of neighboring-hop radio access network nodes are different, and a case in which the first radio access network node and a previous-hop radio access network node use a same backhaul link resource does not occur. In this way, a problem that the previous-hop radio access network node cannot provide a data backhaul service for the first radio access network node because the first radio access network node and a backhaul link of the previous-hop radio access network node accessed by the first radio access network node use a same transmission resource can be avoided.

The resource configuration information in the foregoing embodiment is described below.

The resource configuration information includes a combination of any one or more pieces of the following information:

information A: global resource configuration information;

information B: transmission resource information used in a first link of the previous-hop radio access network node accessed by the first radio access network node; and information C: transmission resource information used in a second link of the previous-hop radio access network node.

About the Information A:

The global resource configuration information is used to indicate allocation of the transmission resource used in the second link and a manner in which a second link of each hop of first-type radio access network node uses the transmission resource, and may include a combination of any one or more pieces of the following information:

one group of resource information in at least two groups of information corresponding to a transmission resource group used in the second link;

a quantity of groups of transmission resources used in the second link;

a grouping mode of the transmission resource used in the second link;

an index value of the grouping mode of the transmission resource used in the second link;

a configuration manner of a transmission resource used in the first link and transmission resources used in second links of various groups of first-type radio access network nodes;

an index value of the configuration manner of the transmission resource used in the first link and the transmission resources used in the second links of the various groups of first-type radio access network nodes;

a configuration manner of transmission resources used in various groups of second links; and an index value of the configuration manner of the transmission resources used in the various groups of second links.

In an implementation, the global resource configuration information further includes the transmission resource information used in the first link, and a resource indicated by the transmission resource information used in the first link is a transmission resource used in a first link of each hop of radio access network node in the first-type radio access network node.

The first link of each hop of radio access network node in the first-type radio access network node uses a same transmission resource.

In another implementation, the global resource configuration information further includes transmission resource indication information used in the first link, where the transmission resource indication information used in the first link is used to indicate that a transmission resource used in a first link of the first radio access network node is the same as the transmission resource used in the second link of the next-hop radio access network node, or a transmission resource used in a first link of the first radio access network node is a subset of the transmission resource used in the second link of the next-hop radio access network node.

The first link may be an access link, and is a communications link between the first-type radio access network node and a terminal device, for example, may be the communications link between the third-hop RN and the terminal device in FIG. 2. Correspondingly, the transmission resource used in the first link is a transmission resource used in the access link, and the transmission resource information used in the first link may be information, such as a number of the transmission resource used in the first link, used to indicate the transmission resource used in the first link. For example, if the transmission resource information used in the first link is used to indicate a subframe resource, the transmission resource information used in the first link may include a subframe number 1 to a subframe number x.

The second link may be a backhaul link, and is a communications link between the first radio access network node and the previous-hop radio access network node, for example, may be the communications link between the third-hop RN and the second-hop RN accessed by the third-hop RN in FIG. 2. Correspondingly, the transmission resource used in the second link is a transmission resource used in the backhaul link.

A quantity of groups of transmission resources used in the second link is a quantity of groups into which transmission resources allocated to all second links of the first-type radio access network node are divided. Wireless transmission resource information corresponding to a transmission resource group used in each second link may be information, such as a wireless transmission resource number corresponding to the transmission resource group used in the second link, used to indicate the transmission resource information that is used in the second link and that is included in the transmission resource group used in each second link.

For example, the transmission resources to be allocated to all the second links of the first-type radio access network node for use may be divided into two groups: a transmission resource used in a second link of an even-hop RN and a transmission resource used in a second link of an odd-hop RN. Alternatively, for example, the transmission resource used in the second link is a subframe resource, and the transmission resources to be allocated to all the second links of the first-type radio access network node are a subframe x to a subframe y. The transmission resources used in the second links may be divided into three groups, and wireless transmission resource information corresponding to a transmission resource group used in each second link is shown in Table 1. A group 1 includes a subframe number x+1 to a subframe number m, a group 2 includes a subframe number m+1 to a subframe number n, and a group 3 includes a subframe number n+1 to the subframe number y.

TABLE 1

| | |
|---|---|
| Group 1 | Subframe x + 1 to subframe m |
| Group 2 | Subframe m + 1 to subframe n |
| Group 3 | Subframe n + 1 to subframe y |

It should be noted that, corresponding to the transmission resource groups used in the second links, the first-type radio access network nodes may be grouped based on a quantity of hops. For example, a first-hop RN, a fourth-hop RN, and a seventh-hop RN are the group 1; a second-hop RN, a fifth-hop RN, and an eighth-hop RN are the group 2; and a third-hop RN, a sixth-hop RN, and a ninth-hop RN are the group 3. Groups of the quantity of hops of the RNs have a one-to-one correspondence with the transmission resources used in the second links. For example, a mapping relationship between the groups of the RNs and the transmission resource groups used in the second links may be specified, or a group index value may be specified for the first radio access network node.

A configuration ratio of the transmission resource used in the first link and the transmission resource used in the second link of each group of first-type radio access network nodes is a ratio of the transmission resource used in the first link to total wireless transmission resources and a ratio of the transmission resource used in the second link of each group of first-type radio access network nodes to the total wireless transmission resources. Each configuration ratio corresponds to an allocation mode for the transmission resource used in the first link and the transmission resource used in the second link. The total wireless transmission resources include the transmission resource used in the first link and the transmission resources to be allocated to all the second links of the first-type radio access network node.

In one embodiment, the second radio access network node and the first-type radio access network node may store a mapping relationship between the allocation mode and the configuration ratio of the transmission resource used in the first link and the transmission resources used in the second links of each group of first-type radio access network nodes.

For example, the configuration ratio of the transmission resource used in the first link and the transmission resources used in the second links of each group of first-type radio access network nodes is a configuration ratio of an access link resource and backhaul link resources of each group of RNs. Each configuration ratio corresponds to an allocation mode for the access link resource and the backhaul link resource. In an example, a mapping relationship between the allocation mode and the configuration ratio of the access link resource, a backhaul link resource of an odd-hop RN, and a backhaul link resource of an even-hop RN is shown in Table 2.

TABLE 2

| Configuration ratio of the access link, the backhaul link resource of the odd-hop RN, and the backhaul resource of the even-hop RN | Allocation mode | |
|---|---|---|
| 1:1:1 | Allocation mode 1 | Access link resources: subframe 1 to subframe x<br>Backhaul link resources corresponding to the even-hop RN: subframe x + 1 to subframe m<br>Backhaul link resources corresponding to the odd-hop RN: subframe m + 1 to subframe y |
| 1:2:2 | Allocation mode 2 | Access link resources: subframe 1 to subframe m<br>Backhaul link resources corresponding to the even-hop RN: subframe m + 1 to subframe n<br>Backhaul link resources corresponding to the odd-hop RN: subframe n + 1 to subframe y |

Similar to Table 2, the configuration ratio of the transmission resources used in the second links of each group of first-type radio access network nodes is a ratio of the transmission resources used in the second links of each group of first-type radio access network nodes to the total wireless transmission resources. Each configuration ratio corresponds to an internal allocation mode for the transmission resource used in the second link. The total wireless transmission resources include the transmission resources allocated to all the second links of each group of first-type radio access network nodes for use.

In one embodiment, the second radio access network node and the first-type radio access network node may store a mapping relationship between an allocation mode and a configuration ratio of transmission resources used in each group of second links.

For example, the configuration ratio of the transmission resources used in the second links of each group of first-type radio access network nodes is a configuration ratio of backhaul link resources of each group of RNs. Each configuration ratio corresponds to an allocation mode for the backhaul link resource. In an example, a mapping relationship between the allocation mode and the configuration ratio of backhaul link resources of an odd-hop RN and an even-hop RN is shown in Table 3.

TABLE 3

| Configuration ratio of the backhaul link resources of the odd-hop RN and the even-hop RN | Allocation mode | |
|---|---|---|
| 1:1 | Allocation mode 1 | Backhaul link resources corresponding to the even-hop RN: subframe 1 to subframe m<br>Backhaul link resources corresponding to the odd-hop RN: subframe m + 1 to subframe y |
| 1:2 | Allocation mode 2 | Backhaul link resources corresponding to the even-hop RN: subframe 1 to subframe n<br>Backhaul link resources corresponding to the odd-hop RN: subframe n + 1 to subframe y |

An index value of the allocation mode for the transmission resource used in the first link and the transmission resource used in the second link is used to indicate the allocation mode for the transmission resource and the backhaul link resource used in the first link of the first radio access network node. For example, the index value of the allocation mode may be a number of the allocation mode. For example, if the index value of the allocation mode is 1, it indicates that the first radio access network node may determine, based on the allocation mode 1 in Table 2, the transmission resource used in the first link and the transmission resource used in the second link of the first radio access network node. Similarly, an index value of the allocation mode for the transmission resource used in the second link is used to indicate the allocation mode for the backhaul link resource of the first radio access network node. For example, the index value of the allocation mode may be a number of the allocation mode. For example, if the index value of the allocation mode is 1, it indicates that the first radio access network node may determine, based on the allocation mode 1 in Table 3, the transmission resource used in the second link of the first radio access network node.

In one embodiment, the group information shown in Table 1 and the allocation mode information shown in Table 2 and Table 3 may be dynamically notified to the first radio access network node in an explicit manner. For example, resource configuration information of a current network is obtained when the first radio access network node accesses the network. Alternatively, the first access network node may be notified in a preconfiguration manner or a protocol stipulation manner. For example, the first radio access network node and the second radio access network node may prestore the group information of the transmission resource used in the second link and resource allocation corresponding to each allocation mode. After further obtaining a group index value or an allocation mode index value, the first radio access network node may determine resources that may be used by the first radio access network node.

It should be noted that, the subframe resource division manners shown in Table 1, Table 2, and Table 3 are only examples, and the subframe resources are not necessarily continuous in the present invention. For example, the access link resources and each group of backhaul link resources may be discontinuous, or subframes of the access link resources and each group of backhaul link resources may be alternately allocated, or subframes of each group of backhaul link resources are alternately allocated. In addition, the radio resource in the present invention is not limited to the subframe resources shown in Table 1, Table 2, and Table 3. The radio resource in this application may alternatively be a combination of at least two of a time resource, a spectrum resource, a time-frequency resource, a code resource, a beam resource, and the foregoing resource. Similarly, allocation of the foregoing various resources may also be performed discontinuously or alternately.

About the Information B:

The information B is the transmission resource information used in the first link of the previous-hop radio access network node accessed by the first radio access network node.

The transmission resource information used in the first link may be a number of the transmission resource used in the first link.

For example, if the first radio access network node is the third-hop RN in FIG. 2, the previous-hop radio access network node accessed by the first radio access network node is the second-hop RN accessed by the third-hop RN, and the information B is a number of a transmission resource used in an access link of the second-hop RN.

About the Information C:

The information C is the transmission resource information used in the second link of the previous-hop radio access network node.

The transmission resource information used in the second link may be a number of the transmission resource used in the second link.

For example, if the first radio access network node is the third-hop RN in FIG. 2, the previous-hop radio access network node accessed by the first radio access network node is the second-hop RN accessed by the third-hop RN, and the information C is a number of a transmission resource used in a backhaul link of the second-hop RN.

Figure 9:
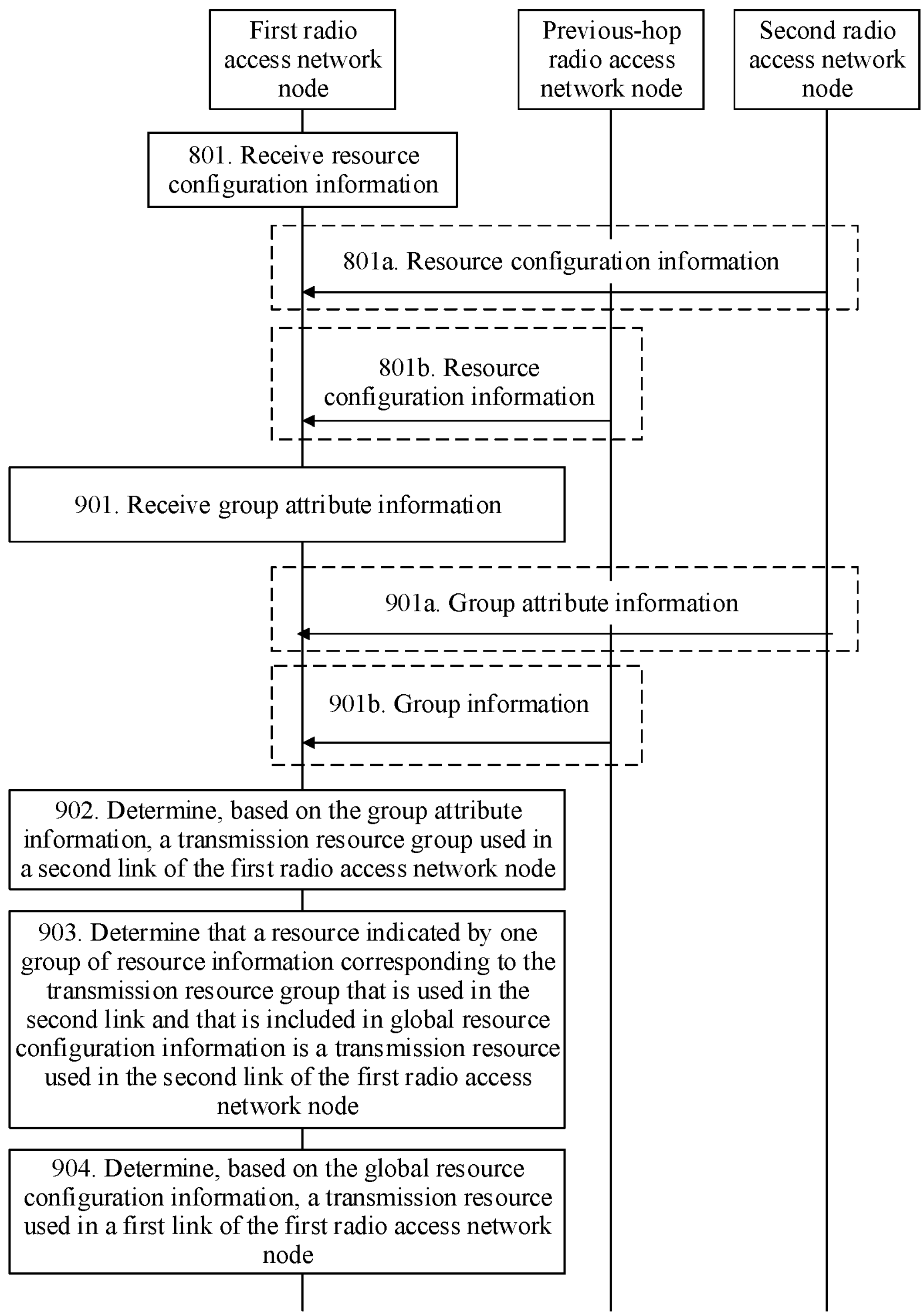
FIG. 9 is a flowchart of another resource allocation method according to an embodiment of this application.

In one embodiment, the first radio access network node may further select the transmission resource information of the second link from the resource configuration information with reference to group attribute information. Based on this, in another implementation of this embodiment of this application, as shown in FIG. 9, before operation 802 in which the first radio access network node uses the resource indicated by one group of resource information in the resource configuration information as the transmission resource used in the second link of the first radio access network node, operation 901 may be further performed.

901. The first radio access network node receives the group attribute information.

The group attribute information is used to indicate the transmission resource information of the first radio access network node or the previous-hop radio access network node accessed by the first radio access network node, or other transmission resource information used to derive the first radio access network node or the previous-hop radio access network node accessed by the first radio access network node.

The group attribute information may be group index information or information related to a quantity of hops. The group attribute information may include a combination of one or more pieces of the following information:

a group index of the first radio access network node;

a quantity of hops of the first radio access network node;

parity of the quantity of hops of the first radio access network node;

a group index of the previous-hop radio access network node accessed by the first radio access network node;

a quantity of hops of the previous-hop radio access network node accessed by the first radio access network node; and parity of the quantity of hops of the previous-hop radio access network node accessed by the first radio access network node.

The group index may be a group number.

operation 901 may be implemented as operation 901*a* or operation 901*b*.

901*a*. The first radio access network node receives group attribute information from the second radio access network node.

901*b*. The first radio access network node receives group attribute information from the previous-hop radio access network node.

It should be noted that, the donor base station may send the group attribute information to the first radio access network node by using various hops of radio access network nodes between the donor base station and the first radio access network node hop by hop. That is, after receiving a group attribute, the previous-hop radio access network node may send the group attribute information to the first radio access network node.

It should be noted that, the previous-hop radio access network node or the second radio access network node may send a broadcast message or send dedicated signaling to the first radio access network node. The dedicated signaling may be an RRC message, and the broadcast message or the dedicated signaling includes group attribute information.

In one embodiment, when the first radio access network node receives the group attribute information, in operation 802 in which the first radio access network node uses the resource indicated by one group of resource information in the resource configuration information as the transmission resource used in the second link of the first radio access network node may be implemented as operation 902 and operation 903.

902. The first radio access network node determines, based on the group attribute information, a transmission resource group used in the second link of the first radio access network node.

903. The first radio access network node determines that a resource indicated by one group of resource information corresponding to the transmission resource group that is used in the second link and that is included in the global resource configuration information is the transmission resource used in the second link of the first radio access network node.

Different specific information included in the global resource configuration information indicates different methods in which the first radio access network node determines the resource used in the second link of the first radio access network node. A specific determining method is described in the following.

Further, in one embodiment, because the global resource configuration information further includes the transmission resource information used in the first link or the transmission resource indication information used in the first link, the method further includes operation 904.

904. The first radio access network node determines, based on the global resource configuration information, the transmission resource used in the first link of the first radio access network node.

It should be noted that, the resource configuration information in operation 801 and the group attribute information in operation 901 may be carried in a same message, or the resource configuration information and the group attribute information may be sent by using two messages.

In one embodiment, the previous-hop radio access network node or the second radio access network node may send a broadcast message to the first radio access network node twice, or send dedicated signaling twice, or send a broadcast message once and dedicated signaling once.

For example, the broadcast message or the dedicated signaling sent for the first time includes some content in the resource configuration information and the group attribute information, and the broadcast message or the dedicated signaling sent for the second time includes the other content in the resource configuration information.

For another example, the broadcast message or the dedicated signaling sent for the first time carries the resource configuration information, and the broadcast message or the dedicated signaling sent for the second time carries the group attribute information. Alternatively, the broadcast message or the dedicated signaling sent for the first time carries the global resource configuration information, and the broadcast message or the dedicated signaling sent for the second time carries the transmission resource information used in the first link of the previous-hop radio access network node and the transmission resource information used in the second link of the previous-hop radio access network node.

The resource configuration information and the group attribute information include a plurality of combination manners. Specific content included in the resource configuration information is different from that included in the group attribute information. In the embodiments in FIG. 8 and FIG. 9, the methods in which the first radio access network node determines the transmission resource used in the first link of the first radio access network node and the transmission resource used in the second link of the first radio access network node are different. For example, this embodiment of this application may provide the following six implementations:

Method 1: The first radio access network node receives the resource configuration information from the previous-hop radio access network node, where the resource configuration information is the global resource configuration information; the first radio access network node determines, based on the group attribute information, a transmission resource group used in the second link of the first radio access network node; and the first radio access network node determines that a resource indicated by one group of resource information corresponding to the transmission resource group that is used in the second link and that is included in the global resource configuration information is the transmission resource used in the second link of the first radio access network node.

Further, if the global resource configuration information includes the transmission resource information used in the first link, the first radio access network node uses a resource indicated by the transmission resource information used in the first link as the transmission resource information used in the first link of the first radio access network node.

If the resource configuration information includes transmission resource indication information used in the first link, the first radio access network node may determine group attribute information of a next-hop radio access network node based on the group attribute information of the first radio access network node; determine, based on the group attribute information of the next-hop radio access network node and the global resource configuration information, transmission resource information used in a second link of the next-hop radio access network node (or the first radio access network node determines, based on resource information used in the second link of the first radio access network node and the global resource configuration information, transmission resource information used in a second link of the next-hop radio access network node); and use a resource indicated by the transmission resource information used in the second link of the next-hop radio access network node as the transmission resource used in the first link of the first radio access network.

It should be noted that, the global resource configuration information is generated by the second radio access network node, and is forwarded by various hops of first-type radio access network nodes to the first radio access network node hop by hop. The group attribute information may be generated by the second radio access network node, and is forwarded by various hops of first-type radio access network nodes to the first radio access network node hop by hop. Alternatively, the group attribute information may be generated by the previous-hop radio access network node, and is sent to the first radio access network node. Signaling occupied by the group attribute information (for example, a quantity of hops) may be relatively small, and may also be applied to a procedure such as access control. Therefore, the previous-hop radio access network node may notify the first radio access network node in a broadcast manner by adding the group attribute information to a system message of the previous-hop radio access network node. Signaling occupied by the resource configuration information is usually relatively large, and the first-type radio access network node or the previous-hop radio access network node may notify the first radio access network node by using dedicated signaling, so that the first radio access network node can learn, by combining the two pieces of information, of the transmission resources used in the first link and the second link of the first radio access network node. An advantage of the method is that the method is relatively flexible, and broadcast signaling overheads can be reduced.

For example, the second radio access network node is a donor base station, and the first radio access network node is an RN 3. After generating the global resource configuration information, the donor base station sends the global resource configuration information to an RN 1, the RN 1 sends the global resource configuration information to an RN 2, and then the RN 2 sends the global resource configuration information to the RN 3.

If the global resource configuration information includes one group of resource information in the at least two groups of resource information corresponding to the transmission resource group used in each second link, the first radio access network node may determine, based on the group attribute information, the transmission resource group used in the second link of the first radio access network node; further, may search, based on the transmission resource group used in the second link, the global resource configuration information for one group of resource information corresponding to the resource group used in the second link; use a resource indicated by the group of found resource information as the transmission resource used in the second link of the first radio access network node; then, search for one group of resource information corresponding to a resource group used in the second link of the next-hop radio access network node; and use all or a part of a resource indicated by the group of resource information corresponding to the resource group used in the second link as the transmission resource used in the first link of the first radio access network node.

If the global resource configuration information includes the transmission resource information used in the first link and one group of resource information in the at least two groups of resource information corresponding to the transmission resource group used in each second link, and the group attribute information includes the group index of the first radio access network node, the first radio access network node may determine that the resource indicated by the transmission resource information that is used in the first link and that is included in the global resource configuration information is the transmission resource used in the first link of the first radio access network node, and determine, based on the group index of the first radio access network node, the transmission resource group used in the second link of the first radio access network node; further, may search, based on the transmission resource group used in the second link, the global resource configuration information for one group of resource information corresponding to the transmission resource group used in the second link; and use the transmission resource that is used in the second link and that is indicated by the found transmission resource information used in the second link as the transmission resource used in the second link of the first radio access network node.

If the group attribute information includes the group index of the previous-hop radio access network node accessed by the first radio access network node, the first radio access network node may determine the group index of the first radio access network node based on the group index of the previous-hop radio access network node, and then determine, based on the group index of the first radio access network node, the transmission resource used in the second link. For example, if a total quantity of groups is 2, and the group index of the previous-hop radio access network node is 2, the group index of the first radio access network node may be 1.

For example, if the first radio access network node is the third-hop RN (RN 3), the transmission resource information that is used in the access link and that is included in the global resource configuration information is a subframe number 1 to a subframe number x, and backhaul link resource information corresponding to a transmission resource group used in each backhaul link is shown in Table 1. If the group index of the first radio access network node included in the group attribute information is 2, the RN 3 may determine that transmission resources used in an access link of the RN 3 are a subframe 1 to a subframe x, and transmission resources used in a backhaul link of the RN 3 are a subframe m+1 to a subframe n that are indicated by the group 2.

Alternatively, if the group attribute information includes the quantity of hops of the first radio access network node or parity of the quantity of hops of the first radio access network node, the first radio access network node may determine, based on the quantity of hops or the parity of the quantity of hops of the first radio access network node, the transmission resource group used in the second link of the first radio access network node; further, may search, based on the transmission resource group used by the second link, the global resource configuration information for a group of resource information corresponding to the transmission resource group used in the second link; and use a resource indicated by the group of found resource information corresponding to the transmission resource group used in the second link as the transmission resource used in the second link of the first radio access network node.

If the group attribute information includes a quantity of hops or parity of a quantity of hops of the previous-hop radio access network node accessed by the first radio access network node, the first radio access network node may determine the quantity of hops or the parity of the quantity of hops of the first radio access network node based on the quantity of hops or the parity of the quantity of hops of the previous-hop radio access network node; and further, determine, based on the quantity of hops or the parity of the quantity of hops of the first radio access network node, the transmission resource used in the second link of the first radio access network node. For example, if the quantity of hops of the previous-hop radio access network node is 2, the quantity of hops of the first radio access network node is 3; and if the quantity of hops of the previous-hop radio access network node is an even number, the quantity of hops of the first radio access network node is an odd number.

In one embodiment, the global resource configuration information may include a group policy of the first-type radio access network node, or each hop of first-type radio access network node stores a group policy of the first-type radio access network node. For example, a first-hop RN, a fourth-hop RN, and a seventh-hop RN are a group 1; a second-hop RN, a fifth-hop RN, and an eighth-hop RN are a group 2; and a third-hop RN, a sixth-hop RN, and a ninth-hop RN are a group 3. The groups of the first-type radio access network nodes have a one-to-one correspondence with transmission resource groups used in second links. Therefore, after determining the group of the first radio access network node based on the group policy and information about the quantity of hops of the first radio access network node, the first radio access network node may use the transmission resource that is used in the second link and that is indicated by the transmission resource information used in the second link and corresponding to the group as the transmission resource used in the second link of the first radio access network node.

For example, if the first radio access network node is an RN 3, a quantity of hops of the RN 3 included in the group attribute information is 3, or a quantity of hops of the RN 3 is an odd number. If the global resource configuration information includes transmission resource information used in a backhaul link of an even-hop RN and transmission resource information used in a backhaul link of an odd-hop RN, the RN 3 may determine, based on the quantity of hops "3" of the RN 3, that the quantity of hops of the RN 3 is an odd number, or directly determine, based on parity of the quantity of hops of the RN included in the group attribute information, that the quantity of hops of the RN 3 is an odd number; and further, determine that a transmission resource that is used in the backhaul link and that is indicated by the transmission resource information used in the backhaul link of the odd-hop RN is the transmission resource used in the backhaul link of the RN 3.

If the first radio access network node is an RN 3, the quantity of hops of the RN 3 included in the group attribute information is 3. If the global resource configuration information includes the backhaul link resource information corresponding to the transmission resource group used in each backhaul link shown in Table 1, with reference to the example of the group policy, the RN 3 may determine, based on the group policy, that the third-hop RN belongs to the group 3; and further, determine, according to Table 1, that the subframe n+1 to the subframe y corresponding to the group 3 are the transmission resources used in the backhaul link of the RN 3.

Method 2: The method 2 corresponds to the resource allocation method shown in FIG. 6. A prerequisite for implementing the method 2 is that the global resource configuration information includes the transmission resource information used in the first link, and transmission resources used in first links of all hops of radio access network nodes in the first-type radio access network node are the same.

The method includes the operations: receiving, by the first radio access network node, the resource configuration information from the previous-hop radio access network node, where the resource configuration information includes the global resource configuration information, the transmission resource information used in the first link of the previous-hop radio access network node, and the transmission resource information used in the second link of the previous-hop radio access network node; and determining, by the first radio access network node, that a resource indicated by one group of resource information different from the transmission resource information that is used in the second link of the previous-hop radio access network node and that is included in the global resource configuration information is the transmission resource used in the second link of the first radio access network node; and determining that a resource indicated by the transmission resource information used in the first link of the previous-hop radio access network node is the transmission resource used in the first link of the first radio access network node.

The global resource configuration information includes one group of resource information in at least two groups of resource information corresponding to a transmission resource group used in each second link. The first radio access network node may derive, based on the transmission resource information used in the second link of the previous-hop radio access network node, the transmission resource information used in the second link of the first radio access network node. For example, the transmission resource that is used in the second link and that corresponds to the transmission resource group used in each second link is shown in Table 1. If the transmission resource information used in the second link of the previous-hop radio access network node is a resource indicated by a group of resource information corresponding to an even-hop group, the first radio access network node may determine that the transmission resource used in the second link of the first radio access network node is a resource indicated by a group of resource information corresponding to an even-hop group.

Alternatively, the global resource configuration information includes a configuration ratio of the transmission resource used in the first link to transmission resources used in various groups of second links. The first radio access network node may derive, based on information about the second link of the previous-hop radio access network node, the transmission resource information used in the second link of the first radio access network node. For example, the configuration ratio of the transmission resource used in the first link to the transmission resources used in the various groups of second links is shown in Table 2. If the transmission resource information used in the second link of the previous-hop radio access network node is the subframe x+1 to the subframe m, the first radio access network node may determine, according to Table 2, a backhaul link resource corresponding to the even-hop RN in the allocation mode 1 used by the previous-hop radio access network node. Further, the first radio access network node may determine that a backhaul link resource corresponding to the odd-hop RN in the allocation mode 1 is a backhaul link resource of the first radio access network node, and determine that an access link resource specified in the allocation mode 1 is an access link resource of the first access network node.

Alternatively, the global resource configuration information includes a configuration ratio of transmission resources used in various groups of second links. The first radio access network node may derive, based on information about the second link of the previous-hop radio access network node, the transmission resource information used in the second link of the first radio access network node. For example, the configuration ratio of the transmission resources used in the various groups of second links is shown in Table 3. If the transmission resource information used in the second link of the previous-hop radio access network node is the subframe 1 to the subframe m, the first radio access network node may determine, according to Table 3, a backhaul link resource corresponding to the even-hop RN in the allocation mode 1 used by the previous-hop radio access network node. Further, the first radio access network node may determine that a backhaul link resource corresponding to the odd-hop RN in the allocation mode 1 is a backhaul link resource of the first radio access network node, and determine that an access link resource of the first radio access network node is a resource corresponding to the backhaul link of the even-hop RN.

Method 3: The method 3 corresponds to the resource allocation method shown in FIG. 7. A prerequisite for implementing the method 3 is that the global resource configuration information includes transmission resource indication information used in the first link, where the transmission resource indication information used in the first link is used to indicate that the transmission resource used in the first link of the first radio access network node is the same as the transmission resource used in the second link of the next-hop radio access network node, or the transmission resource used in the first link of the first radio access network node is a subset of the transmission resource used in the second link of the next-hop radio access network node.

The method includes the operations: receiving, by the first radio access network node, resource configuration information from the previous-hop radio access network node, where the resource configuration information includes at least one of the global resource configuration information, the transmission resource information used in the second link of the previous-hop radio access network node, and the transmission resource information used in the first link of the previous-hop radio access network node; and determining, by the first radio access network node, that a resource indicated by one group of resource information different from the transmission resource information that is used in the second link of the previous-hop radio access network node and that is included in the global resource configuration information is the transmission resource used in the second link of the first radio access network node; or determining, by the first radio access network node, that all or a part of a resource indicated by the transmission resource information used in the first link of the previous-hop radio access network node is the transmission resource used in the second link of the first radio access network node; and determining, by the first radio access network node based on the transmission resource information used in the second link of the first radio access network node and the global resource configuration information, the transmission resource used in the first link of the first radio access network node.

In one embodiment, if the resource configuration information includes the global resource configuration information and the transmission resource information used in the second link of the previous-hop radio access network node, the first radio access network node determines, based on the transmission resource information used in the second link of the previous-hop radio access network node and the global resource configuration information, the transmission resource used in the second link of the first radio access network node; and determines, based on the transmission resource information used in the second link of the first radio access network node and the global resource configuration information, the transmission resource used in the first link of the first radio access network node.

For the operation of determining, by the first radio access network node based on the transmission resource information used in the second link of the previous-hop radio access network node and the global resource configuration information, the transmission resource used in the second link of the first radio access network node, refer to the description in the method 2, and details are not described herein again.

After determining the transmission resource used in the second link of the first radio access network node, the first radio access network node may determine, based on the transmission resource information used in the second link of the first radio access network node and the global resource configuration information, the transmission resource used in the second link of the next-hop radio access network node; and further, determine that all or a part of the transmission resource used in the second link of the next-hop radio access network node is the transmission resource used in the first link of the first radio access network node.

For example, with reference to FIG. 7, assuming that the first radio access network node is the RN 2, the transmission resource used by Un3 of the RN 3 may be determined based on the transmission resource used by Un2 of the RN 2 and the global resource configuration information. Transmission resource indication information of the first link indicates that the transmission resource used by Uu3 of the RN 2 is the same as the transmission resource used by Un3 of the RN 3 or is a part of the transmission resource used by Un3 of the RN 3. Further, the RN 2 may determine that a transmission resource used in the first link of the RN 2 is all or a part of the transmission resource used by Un3 of the RN 3.

In one embodiment, if the resource configuration information includes the global resource configuration information and the transmission resource information used in the first link of the previous-hop radio access network node, the first radio access network node determines that all or a part of the resource indicated by the transmission resource information used in the first link of the previous-hop radio access network node is the transmission resource used in the second link of the first radio access network node; and determines, based on the transmission resource information used in the second link of the first radio access network node and the resource configuration information, the transmission resource used in the first link of the first radio access network node.

Because the global resource configuration information includes transmission resource indication information used in the first link, the indication information indicates that the transmission resource used in the first link of the first radio access network node is the same as the transmission resource used in the second link of the next-hop radio access network node or is a part of the transmission resource used in the second link of the next-hop radio access network node. With reference to FIG. 7, if the RN 2 is the first radio access network node, and the resource configuration information includes the transmission resource used by Uu2 of the RN 1, the RN 2 may determine, based on the transmission resource indication information used in the first link, that all or a part of the transmission resource used by Uu2 of the RN 1 is the transmission resource used in the second link of the RN 2.

After determining the transmission resource used in the first link of the first radio access network node, the first radio access network node may determine, based on the transmission resource information used in the second link of the first radio access network node and the global resource configuration information, the transmission resource used in the second link of the next-hop radio access network node; and further, determine that all or a part of the transmission resource used in the second link of the next-hop radio access network node is the transmission resource used in the first link of the first radio access network node.

In one embodiment, if the resource configuration information includes the global resource configuration information, the transmission resource information used in the first link of the previous-hop radio access network node, and the transmission resource information used in the second link of the previous-hop radio access network node, the first radio access network node determines that all or a part of a resource indicated by the transmission resource information used in the first link of the previous-hop radio access network node is the transmission resource used in the second link of the first radio access network node; or determines, based on the transmission resource information used in the second link of the previous-hop radio access network node and the global resource configuration information, the transmission resource used in the second link of the first radio access network node. Then, the first radio access network node determines, based on the transmission resource information used in the second link of the first radio access network node and the resource configuration information, the transmission resource used in the first link of the first radio access network node.

In one embodiment, if transmission resource groups used in the second link include a transmission resource group used in an even-hop second link and a transmission resource group used in an odd-hop second link, the resource configuration information received by the first radio access network node includes the transmission resource information used in the first link of the previous-hop radio access network node and the resource information used in the second link of the previous-hop radio access network node. The first radio access network node may determine that the transmission resource used in the first link of the previous-hop radio access network node is the transmission resource used in the second link of the first radio access network node; and further, determine that the transmission resource used in the second link of the previous-hop radio access network node is the transmission resource used in the first link of the first radio access network node.

Method 4: The first radio access network node receives the resource configuration information from the previous-hop radio access network node, where the resource configuration information may include the global resource configuration information and local resource configuration information, or the resource configuration information includes only local resource configuration information. The first radio access network node uses a resource indicated by the transmission resource information that is used in the second link and that is included in the local resource configuration information as the transmission resource used in the second link of the first radio access network node, and uses a resource indicated by the transmission resource information that is used in the first link and that is included in the local resource configuration information as the transmission resource used in the first link of the first radio access network node.

The local resource configuration information is the transmission resource information used in the first link of the first radio access network node and the transmission resource information used in the second link of the first radio access network node. In other words, the previous-hop radio access network node may directly notify the first radio access network node of the transmission resource information used in the first link of the first radio access network node and the transmission resource information used in the second link of the first radio access network node.

Method 5: The first radio access network node receives the resource configuration information from the second radio access network node in the second-type radio access network node, where the resource configuration information includes the global resource configuration information and local resource configuration information, or the resource configuration information includes only local resource configuration information. Further, the first radio access network node uses a resource indicated by the transmission resource information that is used in the first link and that is included in the local resource configuration information as the transmission resource used in the first link of the first radio access network node, and uses a resource indicated by the transmission resource information that is used in the second link and that is included in the local resource configuration information as the transmission resource used in the second link of the first radio access network node.

Method 6: The first radio access network node receives the resource configuration information from the second radio access network node in the second-type radio access network node, where the resource configuration information includes the global resource configuration information; the first-type radio access network node receives the group attribute information from the second radio access network node; the first radio access network node determines, based on the group attribute information, the transmission resource group used in the second link of the first radio access network node; and the first radio access network node determines that a resource indicated by one group of resource information corresponding to the transmission resource group that is used in the second link and that is included in the global resource configuration information is the transmission resource used in the second link of the first radio access network node.

A difference between the method 6 and the method 1 is that the first radio access network node obtains the first resource configuration information from different sources. A method for determining, by the first radio access network node, the transmission resource used in the first link of the first radio access network node and the transmission resource used in the second link of the first radio access network node is the same as the method 1, and details are not described herein again.

Figure 10:
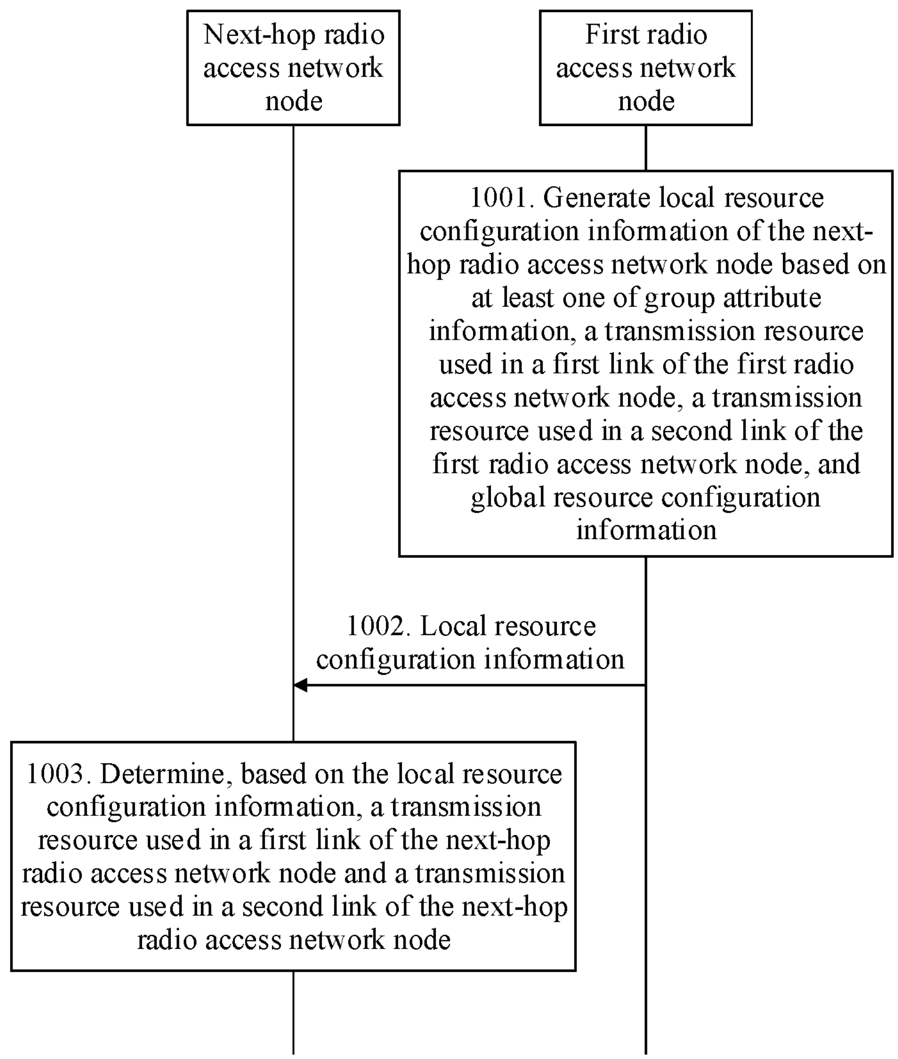
FIG. 10 is a flowchart of another resource allocation method according to an embodiment of this application.

In one embodiment, in another implementation of this embodiment of this application, as shown in FIG. 10, after a first radio access network node determines, based on resource configuration information and/or group attribute information, a transmission resource used in a first link of the first radio access network node and a transmission resource used in a second link of the first radio access network node, the method further includes the following operations.

1001. The first radio access network node generates local resource configuration information of a next-hop radio access network node based on at least one of the group attribute information, the transmission resource used in the first link of the first radio access network node, the transmission resource used in the second link of the first radio access network node, and global resource configuration information.

The local resource configuration information of the next-hop radio access network node includes transmission resource information used in a first link of the next-hop radio access network node and/or transmission resource information used in a second link of the next-hop radio access network node.

After determining the transmission resource used in the first link of the first radio access network node and the transmission resource used in the second link of the first radio access network node, the first radio access network node may derive, based on at least one of the group attribute information, the transmission resource used in the first link of the first radio access network node, the transmission resource used in the second link of the first radio access network node, and the global resource configuration information, a transmission resource used in the first link of the next-hop radio access network node and a transmission resource used in the second link of the next-hop radio access network node.

For example, if the first radio access network node is an RN 3, the next-hop radio access network node is an RN 4.

In a first case, because transmission resources used in access links of various hops of RNs are the same, the RN 3 may determine a transmission resource used in an access link of the RN 3 as a transmission resource used in an access link of a next-hop RN. If the RN 3 determines that a transmission resource used in a backhaul link of the RN 3 is a group of resources corresponding to an odd-hop RN group, the RN 3 may determine that the backhaul link resource of the next-hop RN is a group of resources corresponding to an even-number hop RN group, further, a group of resource information corresponding to the even hop RN group is found from the global resource configuration information, and transmission resource information used by the backhaul link of the even hop RN is used as transmission resource information used by the backhaul link of the next-hop radio access network node.

In a second case, if transmission resource groups used in second links include only a transmission resource group used in an even-hop second link and a transmission resource group used in an odd-hop second link, the first radio access network node may generate the local resource configuration information of the next-hop radio access network node based on the transmission resource used in the first link of the first radio access network node and the transmission resource used in the second link of the first radio access network node. In one embodiment, the first radio access network node may determine that a transmission resource used in a backhaul link of the first radio access network node is a transmission resource used in an access link of a next-hop RN and a transmission resource used in an access link of the first radio access network node is a transmission resource used in a backhaul link of the next-hop RN.

Alternatively, the first radio access network node may generate the local resource configuration information of the next-hop radio access network node based on the transmission resource used in the first link of the first radio access network node and the global resource configuration information. In other words, the first radio access network node may determine that all or a part of the transmission resource used in the first link of the first radio access network node is a transmission resource used in a second link of a next-hop first radio access network node. Further, the first radio access network node may determine, based on the transmission resource used in the second link of the next-hop radio access network node and the global resource configuration information, the transmission resource used in the first link of the next-hop radio access network node.

1002. The first radio access network node sends the local resource configuration information of the next-hop radio access network node to the next-hop radio access network node.

1003. The next-hop radio access network node receives the local resource configuration information, and determines, based on the local resource configuration information, the transmission resource used in the first link of the next-hop radio access network node and the transmission resource used in the second link of the next-hop radio access network node.

By using the method in the foregoing embodiment, the first radio access network node may generate the local resource configuration information for the next-hop radio access network node. Because a transmission resource that is used in a second link in each hop of first-type radio access network node and that is included in the global resource configuration information is different, the first radio access network node configures, for the next-hop radio access network node based on the global resource configuration information, transmission resource information different from the transmission resource information used in the second link of the first radio access network node. Therefore, a case in which neighboring-hop radio access network nodes use a same backhaul link resource does not occur. Further, interference caused because the neighboring-hop radio access network nodes use a transmission resource used in a same second link can be avoided. Moreover, no multi-hop radio frequency transceiver apparatus or complex intra-device interference processing unit needs to be configured for the first radio access network node, thereby reducing costs.

Figure 11A:
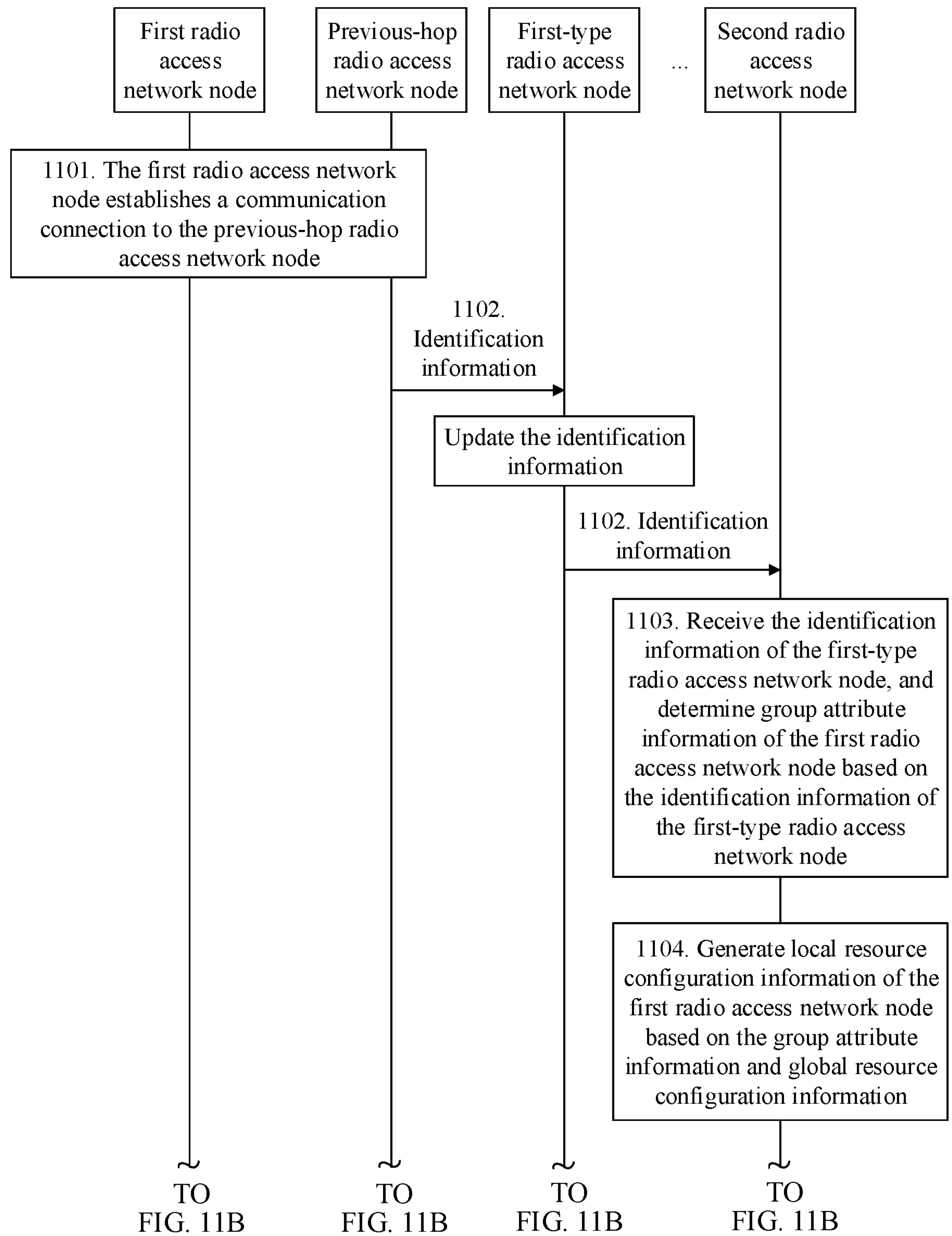
FIG. 11A and FIG. 11B are a flowchart of another resource allocation method according to an embodiment of this application.
Figure 11B:
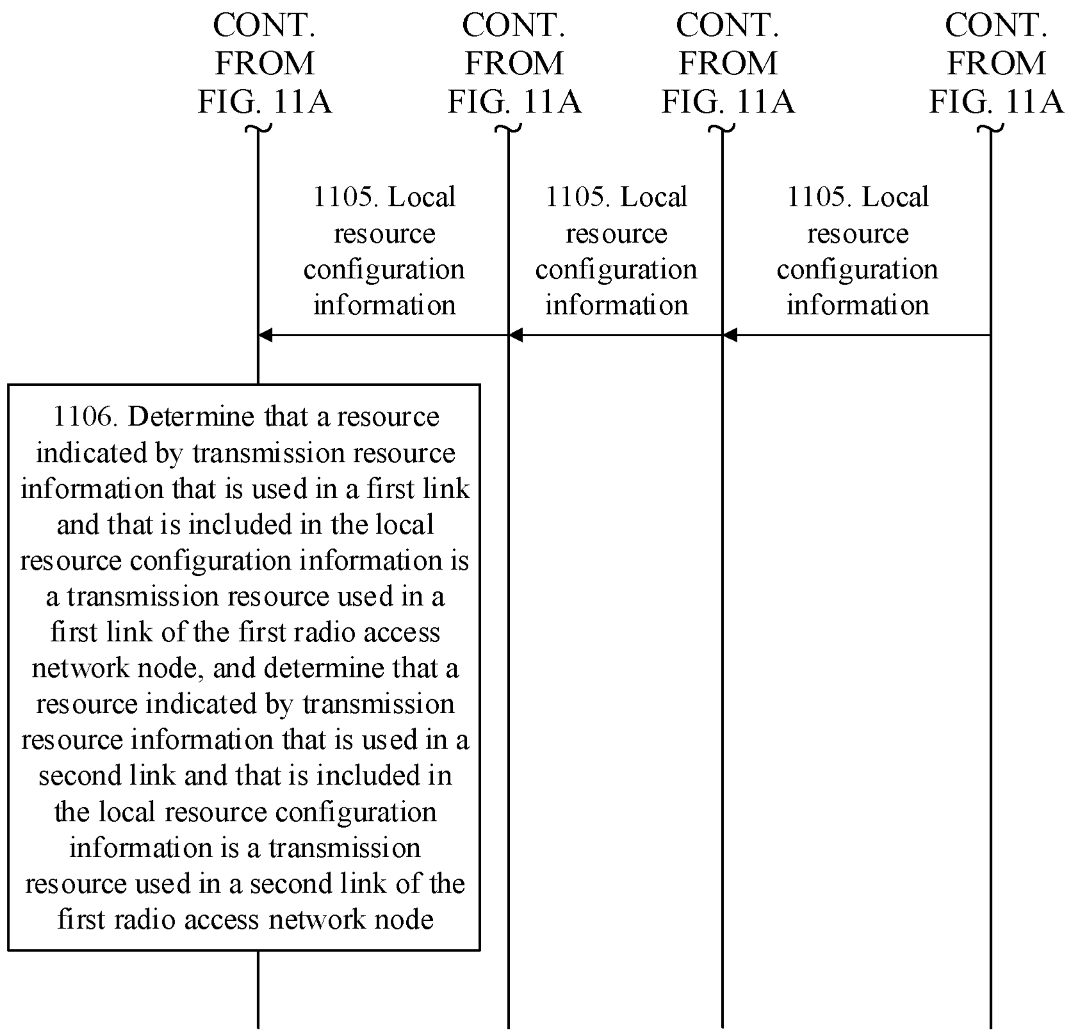

In one embodiment, in another implementation of this embodiment of this application, corresponding to the foregoing method 4, a second radio access network node may obtain group attribute information of a first radio access network node when the first radio access network node performs access, and further, generate local resource configuration information for the first radio access network node based on the group attribute information of the first radio access network node. As shown in FIG. 11A and FIG. 11B, the method includes the following operations.

1101. The first radio access network node establishes a communication connection to a previous-hop radio access network node.

1102. The previous-hop radio access network node sends identification information to the second radio access network node by using various hops of first-type radio access network nodes between the previous-hop radio access network node and the second radio access network node.

The identification information includes an ID of the first radio access network node, an ID of the previous-hop radio access network node, and an ID of a first-type radio access network node forwarding the identification information.

For example, the first radio access network node is an RN 3, and the second radio access network node is a donor base station. The RN 2 sends identification information to an RN 1, where the identification information carries an ID of the RN 3 and an ID of the RN 2. After receiving the identification information, the RN 1 adds an ID of the RN 1 to the identification information, and then, sends the identification information to the donor base station, where the identification information sent to the donor base station carries the ID of the RN 3, the ID of the RN 2, and the ID of the RN 1.

In one embodiment, the identification information may include a variable, and each first-type radio access network node forwarding the identification information performs an operation on the variable. For example, the identification information sent by the RN 2 to the RN 1 carries the variable “2”, and each RN forwarding the identification information adds 1 to the variable. After receiving the identification information, the RN 1 updates the variable “2” in the identification information to the variable “3”, and then, sends the identification information to the donor base station. For another example, the identification information sent by the RN 2 to the RN 1 carries the variable “0”, and each RN forwarding the identification information performs a “0-1 flipping” operation on the variable, to be specific, after receiving the identification information, the RN 1 updates the variable “0” in the identification information to the variable “1”, and sends identification information carrying the variable “1” to the donor base station.

In one embodiment, the first radio access network node may send identification information to the second radio access network node by using various hops of first-type radio access network nodes between the first radio access network node and the second radio access network node.

1103. The second radio access network node receives identification information of the first-type radio access network node, and determines the group attribute information of the first radio access network node based on the identification information of the first-type radio access network node.

The group attribute information includes a combination of any one or more pieces of the following information: a group index of the first radio access network node, a quantity of hops of the first radio access network node, and parity of the quantity of hops of the first radio access network node.

The second radio access network node may determine information about the quantity of hops of the first radio access network node based on the identification information, and further, determine the group attribute information of the first radio access network node based on the information about the quantity of hops of the first radio access network node.

It should be noted that, before receiving the identification information, the second radio access network node needs to determine a type of the identification information first. In one embodiment, the second radio access network node may stipulate a type of the identification information that can be sent by the first-type radio access network node, or the second radio access network node and the first-type radio access network node may negotiate a type of the identification information.

For example, if the donor base station stipulates that the type of the identification information that can be sent by the first-type radio access network node is an ID of an RN, it may be determined that a quantity of IDs of RNs that are carried in the identification information is the quantity of hops of the first radio access network node. If the identification information received by the donor base station carries the ID of the RN 3, the ID of the RN 2, and the ID of the RN 1, the donor base station may determine that the first radio access network node is a third-hop RN. If the identification information received by the donor base station carries the variable “3”, the donor base station may determine that the first radio access network node is the third-hop RN; or if the identification information received by the donor base station carries the variable “1”, the donor base station may determine that the first radio access network node is an odd-hop RN.

1104. The second radio access network node generates the local resource configuration information of the first radio access network node based on the group attribute information and the global resource configuration information.

The second radio access network node first determines, based on the group attribute information, a transmission resource group used in the second link of the first radio access network node. Then, the second radio access network node determines that a resource indicated by one group of resource information corresponding to the transmission resource group that is used in the second link and that is included in the global resource configuration information is the transmission resource used in the second link of the first radio access network node. Next, the second radio access network node determines that a resource indicated by the transmission resource information that is used in the first link and that is included in the global resource configuration information is transmission resource information used in the first link of the first radio access network node. Further, the second radio access network node determines that transmission resource information used in the first link of the first radio access network node and transmission resource information used in the second link of the first radio access network node are the local resource configuration information.

For example, if the donor base station determines, based on the group attribute information, that the first radio access network node is an odd-hop RN, the donor base station determines that a transmission resource used in a backhaul link of the first radio access network node is a group of resources corresponding to a transmission resource group used in a backhaul link of the odd-hop RN, and further, generates the local resource configuration information. The local resource configuration information includes transmission resource information used in an access link and a group of resource information corresponding to the transmission resource group used in the backhaul link of the odd-hop RN.

1105. The second radio access network node sends the local resource configuration information to the first radio access network node by using various hops of first-type radio access network nodes between the second radio access network node and the first radio access network node.

The second radio access network node may add the local resource configuration information to an RN reconfiguration message sent to the first radio access network node, or may send dedicated signaling to the first radio access network node, where the dedicated signaling carries the local resource configuration information.

For example, if the first radio access network node is the RN 3, the donor base station may send the local resource configuration information to the RN 1; then, the RN 1 sends the local resource configuration information to the RN 2; and next, the RN 2 sends the local resource configuration information to the RN 3.

1106. The first radio access network node receives the local resource configuration information, determines that a resource indicated by the transmission resource information that is used in the first link and that is included in the local resource configuration information is the transmission resource used in the first link of the first radio access network node, and determines that a resource indicated by the transmission resource information that is used in the second link and that is included in the local resource configuration information is the transmission resource used in the second link of the first radio access network node.

By using the resource allocation method provided in this embodiment of this application, the second radio access network node may obtain information about a quantity of hops of the first radio access network node in an access process of a first radio access network, determine the group attribute information based on the information about the quantity of hops, and further, generate local resource configuration information of the first radio access network node based on the group attribute information and the global resource configuration information. Further, the first radio access network node may directly determine, based on local resource configuration information, the transmission resource used in the first link of the first radio access network node and the transmission resource used in the second link of the first radio access network node. A base station of the second radio access network node allocates, to the neighboring-hop first radio access network node, a transmission resource different from the transmission resource used in the second link, so that the neighboring-hop first radio access network node transmits data on a different resource, thereby avoiding interference between RNs. In this way, resources are properly allocated to a plurality of hops of RNs in a multi-hop RN deployment scenario.

Figure 12:
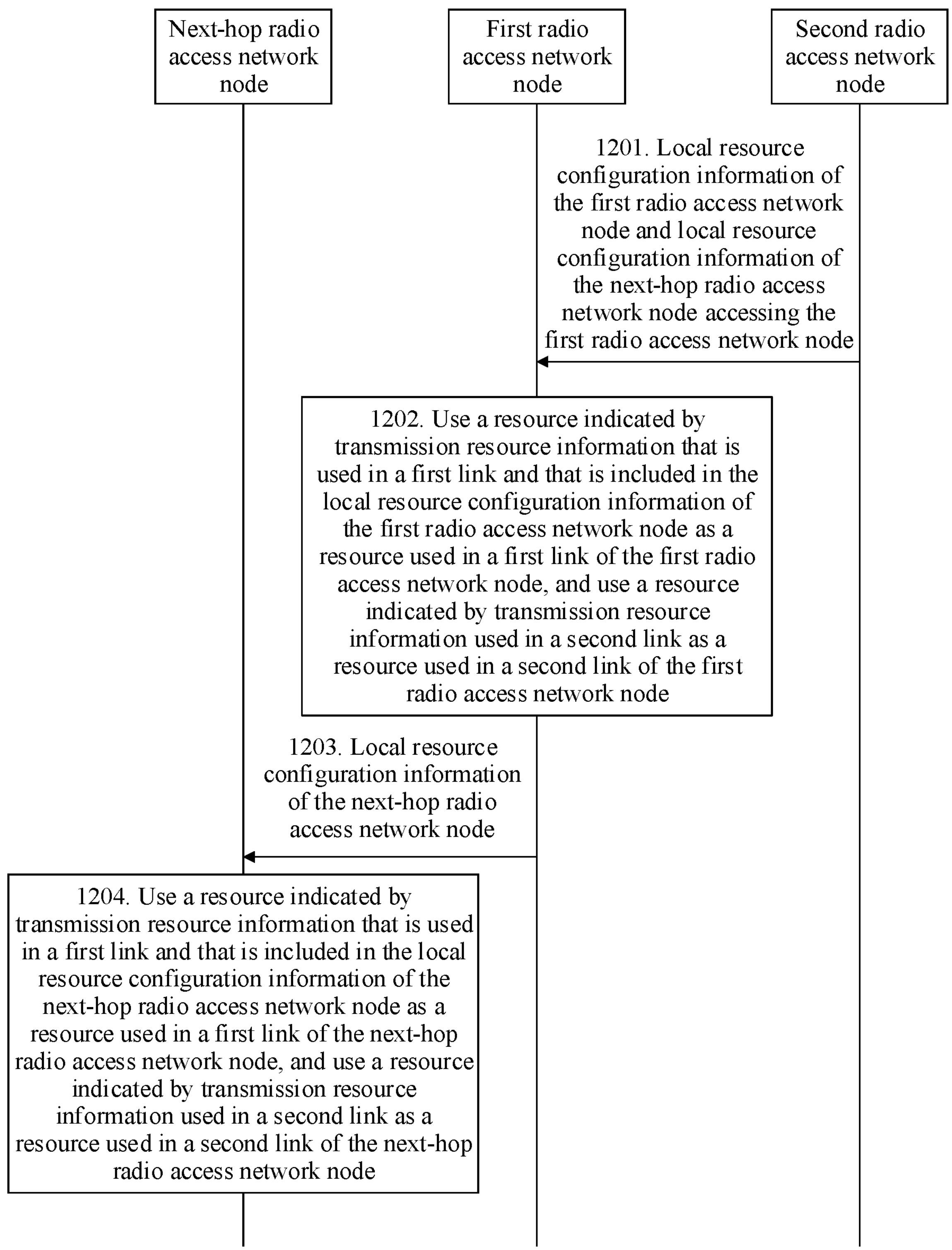
FIG. 12 is a flowchart of another resource allocation method according to an embodiment of this application.

In one embodiment, in another implementation scenario, an embodiment of this application further provides a resource allocation method. As shown in FIG. 12, the method includes the following operations.

1201. A second radio access network node in a second-type radio access network node sends local resource configuration information of a first radio access network node and local resource configuration information of a next-hop radio access network node accessing the first radio access network node to the first radio access network node in a first-type radio access network node. Correspondingly, the first radio access network node receives, from the second radio access network node, the local resource configuration information of the first radio access network node and the local resource configuration information of the next-hop radio access network node accessing the first radio access network node.

The first-type radio access network node is an RN. The first radio access network node is an RN that has accessed a network but to which a wireless transmission resource has not been allocated yet, for example, may be a hop of RN accessing a communications system, or may be an RN accessing a donor base station.

The second-type radio access network node is a donor base station. The second radio access network node is a donor base station accessed by the first radio access network node.

The local resource configuration information of the first radio access network node includes transmission resource information used in a first link of the first radio access network node and transmission resource information used in a second link of the first radio access network node. The local resource configuration information of the next-hop radio access network node includes transmission resource information used in a first link of the next-hop radio access network node and transmission resource information used in a second link of the next-hop radio access network node.

A resource indicated by the transmission resource information that is used in the second link and that is included in the local resource configuration information of the first radio access network node is different from a resource indicated by the transmission resource information that is used in the second link and that is included in the local resource configuration information of the next-hop radio access network node.

For example, the resource indicated by the transmission resource information that is used in the second link and that is included in the local resource configuration information of the first radio access network node is a subframe 1 to a subframe x; and the resource indicated by the transmission resource information that is used in the second link and that is included in the local resource configuration information of the next-hop radio access network node is a subframe x+1 to a subframe y.

In one embodiment, the resource indicated by the transmission resource information that is used in the first link and that is included in the local resource configuration information of the first radio access network node is the same as the resource indicated by the transmission resource information that is used in the first link and that is included in the local resource configuration information of the next-hop radio access network node; or the resource indicated by the transmission resource information that is used in the second link and that is included in the local resource configuration information of the first radio access network node is all or a part of the resource indicated by the transmission resource information that is used in the first link and that is included in the local resource configuration information of the next-hop radio access network node.

1202. The first radio access network node uses the resource indicated by the transmission resource information that is used in the first link and that is included in the local resource configuration information of the first radio access network node as a resource used in the first link of the first radio access network node, and uses the resource indicated by the transmission resource information used in the second link as a resource used in the second link of the first radio access network node.

1203. The first radio access network node sends the local resource configuration information of the next-hop radio access network node to the next-hop radio access network node. Correspondingly, the next-hop radio access network node receives the local resource configuration information from the first radio access network node.

1204. The next-hop radio access network node uses the resource indicated by the transmission resource information that is used in the first link and that is included in the local resource configuration information of the next-hop radio access network node as a resource used in the first link of the next-hop radio access network node, and uses the resource indicated by the transmission resource information used in the second link as a resource used in the second link of the next-hop radio access network node.

The foregoing mainly describes the solutions provided in the embodiments of the present invention from the perspective of the first radio access network node (RN) and the second radio access network node (the donor base station). It may be understood that, the RN and the donor base station each include corresponding hardware structures and/or software modules for performing various functions. A person skilled in the art should easily be aware that, in combination with examples of units and algorithm operations described in the embodiments disclosed in this specification, this application may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that such implementation goes beyond the scope of the present invention.

In the embodiments of this application, the first radio access network node may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is exemplary, and is merely a logical function division. During actual implementation, another division manner may be used.

Figure 13:
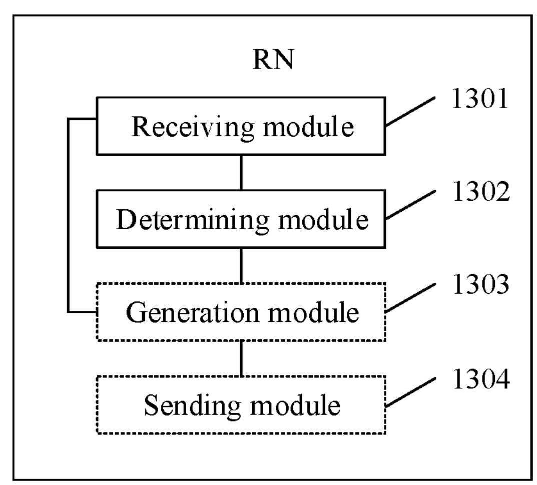
FIG. 13 is a schematic structural diagram of a resource allocation apparatus according to an embodiment of this application.

When each functional module is obtained through division for each corresponding function, an embodiment of this application provides a resource allocation apparatus. The apparatus may be implemented as the first radio access network node in the foregoing embodiment, and the first radio access network node may be an RN. FIG. 13 is a schematic structural diagram of the RN in the foregoing embodiments. The RN includes a receiving module 1301 and a determining module 1302.

The receiving module 1301 is configured to: support the RN in performing operations 801, 801*a*, and 801*b* in FIG. 8, and operations 801, 801*a*, 801*b*, 901, 901*a*, and 901*b* in FIG. 9, receive the local resource configuration information in operation 1105 in FIG. 11B, and support the RN in receiving the information sent in operation 1201 in FIG. 12. The determining module 1302 is configured to support the RN in performing operation 802 in FIG. 8, operations 902 to 904 in FIG. 9, operation 1106 in FIG. 11B, and operation 1202 in FIG. 12.

In one embodiment, the apparatus further includes a generation module 1303 and a sending module 1304.

The generating module 1303 is configured to support the RN in performing operation 1001 in FIG. 10. The sending module 1304 is configured to support the RN in performing operation 1002 in FIG. 10.

All related content of the operations in the foregoing method embodiments may be cited in function descriptions of corresponding functional modules. Details are not described herein again.

When an integrated unit is used, it should be noted that, the receiving module 1301 and the sending module 1304 shown in FIG. 13 may be integrated into the communications interface 403 shown in FIG. 4, so that the communications interface 403 performs specific functions of the receiving module 1301 and the sending module 1304. The determining module 1302 and the generation module 1303 may be integrated into the processor 402 shown in FIG. 4, so that the processor 402 performs specific functions of the determining module 1302 and the generation module 1303.

Figure 14:
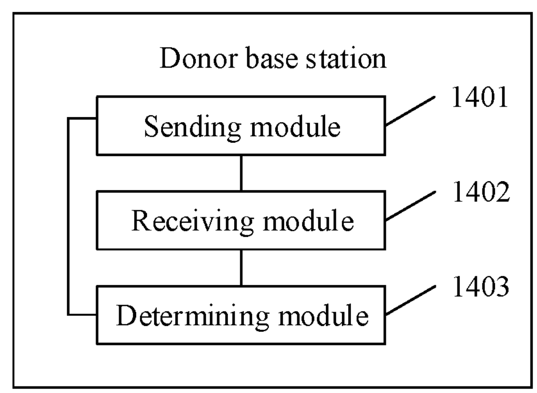
FIG. 14 is a schematic structural diagram of another resource allocation apparatus according to an embodiment of this application.

When each functional module is obtained through division for each corresponding function, an embodiment of this application provides a resource allocation apparatus. The apparatus may be implemented as the second radio access network node in the foregoing embodiment, and the second radio access network node may be a donor base station. FIG. 14 is a schematic structural diagram of the donor base station in the foregoing embodiments. The donor base station includes: a sending module 1401, a receiving module 1402, and a determining module 1403.

The sending module 1401 is configured to support the donor base station in performing operation 801*a* in FIG. 8, operations 801*a* and 901*a* in FIG. 9, operation 1105 in FIG. 11B, and operation 1201 in FIG. 12. The receiving module 1402 is configured to support the donor base station in performing operation 1103 in FIG. 11A. The determining module 1403 is configured to support the donor base station in performing operations 1103 and 1104 in FIG. 12.

All related content of the operations in the foregoing method embodiments may be cited in function descriptions of corresponding functional modules. Details are not described herein again.

When an integrated unit is used, it should be noted that, the sending module 1401 and the receiving module 1402 shown in FIG. 14 may be integrated into the communications interface 503 shown in FIG. 5, so that the communications interface 503 performs specific functions of the sending module 1401 and the receiving module 1402. The determining module 1403 may be integrated into the processor 502 shown in FIG. 5, so that the processor 502 performs a specific function of the determining module 1403.

An embodiment of this application provides a computer-readable storage medium, applied to a first radio access network node. The computer-readable storage medium stores an instruction. When the instruction is run on a computer, the computer is enabled to perform the method performed by the first radio access network node in the foregoing embodiments.

An embodiment of this application further provides a computer program product, for example, a computer-readable storage medium. The computer program product includes a program designed to perform operations performed by the first radio access network node in the foregoing embodiments.

An embodiment of this application provides a computer-readable storage medium, applied to a second radio access network node. The computer-readable storage medium stores an instruction. When the instruction is run on a computer, the computer is enabled to perform the method performed by the second radio access network node in the foregoing embodiments.

An embodiment of this application further provides a computer program product, for example, a computer-readable storage medium. The computer program product includes a program designed to perform operations performed by the second radio access network node in the foregoing embodiments.

The embodiments in this specification are all described in a progressive manner. For same or similar parts in the embodiments, mutual reference may be made to these embodiments, and each embodiment focuses on a difference from other embodiments. Especially, a device embodiment is basically similar to a method embodiment, and therefore is described briefly; for related parts, refer to partial descriptions in the method embodiment.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may include: a magnetic disk, an optical disc, a read-only memory (ROM), or a random access memory (RAM).

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, refer to partial descriptions in the method embodiment.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may include: a magnetic disk, an optical disc, a read-only memory (ROM), or a random access memory (RAM).

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A resource allocation method, comprising:

receiving, by a first radio access network node in a first type of radio access network nodes, resource configuration information that comprises at least two groups of resource information, wherein the at least two groups of resource information include a first group of resource information and a second group of resource information, wherein the first group of resource information indicates a resource that is a transmission resource used in a second link of the first radio access network node, and wherein the second group of resource information indicates a resource that is a transmission resource used in a second link of a next-hop radio access network node accessing the first radio access network node, wherein the resource configuration information further comprises one or more of global resource configuration information, transmission resource information used in a first link of a previous-hop radio access network node accessed by the first radio access network node, or transmission resource information used in a second link of the previous-hop radio access network node, wherein the global resource configuration information comprises one or more pieces of the following information: a quantity of transmission resource groups used in the second link of the first radio access network node or the next-hop radio access network node accessing the first radio access network node, a group of resource information of the at least two groups of resource information, a grouping mode of a transmission resource used in the second link, an index value of the grouping mode of the transmission resource used in the second link, a configuration manner of a transmission resource used in the first link and transmission resources used in second links of various groups of the first type of radio access network nodes, an index value of the configuration manner, a configuration manner of transmission resources used in the second links of the various groups of the first type of radio access network nodes, or an index value of the configuration manner of the transmission resources used in the second links of the various groups of the first type of radio access network nodes; and using, by the first radio access network node, the resource indicated by the first group of resource information in the resource configuration information as the transmission resource used in the second link of the first radio access network node.

2. The resource allocation method according to claim 1, further comprising:

receiving, by the first radio access network node, group attribute information, wherein the group attribute information comprises a combination of one or more pieces of the following information: a group index of the previous-hop radio access network node, a quantity of hops of the previous-hop radio access network node, parity of the quantity of hops of the previous-hop radio access network node, a group index of the first radio access network node, a quantity of hops of the first radio access network node, or parity of the quantity of hops of the first radio access network node.

3. The resource allocation method according to claim 2, wherein the receiving of the resource configuration information, and the using of the resource indicated by the first group of resource information in the resource configuration information as the transmission resource used in the second link of the first radio access network node further comprise:

receiving, by the first radio access network node, the resource configuration information from the previous-hop radio access network node, wherein the resource configuration information is the global resource configuration information;

determining, by the first radio access network node based on the group attribute information, a transmission resource group used in the second link of the first radio access network node; and determining, by the first radio access network node, that a resource indicated by the first group of resource information corresponding to the transmission resource group that is used in the second link of the first radio access network node and that is comprised in the global resource configuration information is the transmission resource used in the second link of the first radio access network node.

4. The resource allocation method according to claim 3, wherein the global resource configuration information further comprises a transmission resource group used in the first link or the transmission resource information used in the first link, wherein the transmission resource group used in the first link comprises the transmission resource information used in the first link, and wherein a resource indicated by the transmission resource information used in the first link is a transmission resource used in a first link of each hop of the first radio access network node in the first type of radio access network nodes.

5. The resource allocation method according to claim 1, wherein the global resource configuration information further comprises transmission resource indication information used in the first link, which indicates that a first link of the first radio access network node uses the transmission resource used in the second link of the next-hop radio access network node, or a subset thereof.

6. A resource allocation method, comprising:

sending, by a second radio access network node in a second type of radio access network nodes, resource configuration information to a first radio access network node in a first type of radio access network nodes, wherein the resource configuration information comprises at least two groups of resource information, wherein the at least two groups of resource information include a first group of resource information and a second group of resource information, wherein the first group of resource information indicates a resource that is a transmission resource used in a second link of the first radio access network node, and wherein the second group of resource information indicates a resource that is a transmission resource used in a second link of a next-hop radio access network node accessing the first radio access network node, wherein the resource configuration information comprises global resource configuration information, wherein the global resource configuration information comprises one or more pieces of the following information: a quantity of transmission resource groups used in the second link of the first radio access network node or the next-hop radio access network node accessing the first radio access network node, a group of resource information of the at least two groups of resource information, a grouping mode of a transmission resource used in the second link, an index value of the grouping mode of the transmission resource used in the second link, a configuration manner of a transmission resource used in a first link of a previous-hop radio access network node accessed by the first radio access network node and transmission resources used in second links of various groups of the first type of radio access network nodes, an index value of the configuration manner, a configuration manner of transmission resources used in the second links of the various groups of the first type of radio access network nodes, or an index value of the configuration manner of the transmission resources used in the second links of the various groups of the first type of radio access network nodes.

7. The resource allocation method according to claim 6, wherein the global resource configuration information further comprises a transmission resource group used in the first link or transmission resource information used in the first link, wherein the transmission resource group used in the first link comprises the transmission resource information used in the first link, and wherein a resource indicated by the transmission resource information used in the first link is a transmission resource used in a first link of each hop of the first radio access network node in the first type of radio access network nodes.

8. The resource allocation method according to claim 6, wherein the global resource configuration information further comprises transmission resource indication information used in the first link, which indicates that a first link of the first radio access network node uses the transmission resource used in the second link of the next-hop radio access network node, or a subset therefore.

9. A resource allocation apparatus, comprising:

at least one processor; and a memory storing instructions executable by the at least one processor, wherein the instructions instruct the at least one processor to perform operations comprising:

receiving, by the apparatus that is a first radio access network node in a first type of radio access network nodes, resource configuration information, wherein the resource configuration information comprises at least two groups of resource information, wherein the at least two groups of resource information include a first group of resource information and a second group of resource information, wherein the first group of resource information indicates a resource that is a transmission resource used in a second link of the apparatus, and wherein the second group of resource information indicates a resource that is a transmission resource used in a second link of a next-hop radio access network node accessing the apparatus, wherein the resource configuration information further comprises one or more of global resource configuration information, transmission resource information used in a first link of a previous-hop radio access network node accessed by the first radio access network node, or transmission resource information used in a second link of the previous-hop radio access network node, wherein the global resource configuration information comprises one or more pieces of the following information: a quantity of transmission resource groups used in the second link of the first radio access network node or the next-hop radio access network node accessing the first radio access network node, a group of resource information that is in the at least two groups of resource information, a grouping mode of a transmission resource used in the second link, an index value of the grouping mode of the transmission resource used in the second link, a configuration manner of a transmission resource used in the first link and transmission resources used in second links of various groups of the first type of radio access network nodes, an index value of the configuration manner, a configuration manner of transmission resources used in the second links of the various groups of the first type of radio access network nodes, or an index value of the configuration manner of the transmission resources used in the second links of the various groups of the first type of radio access network nodes; and using, the resource indicated by the first group of resource information in the resource configuration information as the transmission resource used in the second link of the apparatus.

10. The resource allocation apparatus according to claim 9, further comprising:

receiving, group attribute information, wherein the group attribute information comprises a combination of one or more pieces of the following information: a group index of the previous-hop radio access network node, a quantity of hops of the previous-hop radio access network node, parity of the quantity of hops of the previous-hop radio access network node, a group index of the apparatus, a quantity of hops of the apparatus, or parity of the quantity of hops of the apparatus.

11. The resource allocation apparatus according to claim 10, wherein the receiving of the resource configuration information and the using of the resource indicated by the first group of resource information in the resource configuration information as the transmission resource used in the second link of the apparatus further comprise:

receiving resource configuration information from the previous-hop radio access network node, wherein the resource configuration information is the global resource configuration information;

determining, based on the group attribute information, a transmission resource group used in the second link of the apparatus; and determining that a resource indicated by the first group of resource information corresponding to the transmission resource group that is used in the second link of the first radio access network node and that is comprised in the global resource configuration information is the transmission resource used in the second link of the first radio access network node.

12. The resource allocation apparatus according to claim 9, wherein the global resource configuration information further comprises a transmission resource group used in the first link or the transmission resource information used in the first link, wherein the transmission resource group used in the first link comprises the transmission resource information used in the first link, and wherein a resource indicated by the transmission resource information used in the first link is a transmission resource used in a first link of each hop of the first radio access network node in the first type of radio access network nodes.

13. The resource allocation apparatus according to claim 9, wherein the global resource configuration information further comprises transmission resource indication information used in the first link, which indicates that a first link of the first radio access network node uses the transmission resource used in the second link of the next-hop radio access network node, or a subset thereof.

14. A resource allocation apparatus that is a second radio access network node in a second type of radio network access nodes, comprising:

at least one processor; and a memory storing instructions executable by the at least one processor, wherein the instructions instruct the at least one processor to perform operations comprising:

sending resource configuration information to a first radio access network node in a first type of radio access network nodes, wherein the resource configuration information comprises at least two groups of resource information, wherein the at least two groups of resource information include a first group of resource information and a second group of resource information, wherein the first group of resource information indicates a resource that is a transmission resource used in a second link of the first radio access network node, and wherein the second group of resource information indicates a resource that is a transmission resource used in a second link of a next-hop radio access network node accessing the first radio access network node, wherein the resource configuration information further comprises one or more of global resource configuration information, wherein the global resource configuration information comprises one or more pieces of the following information: a quantity of transmission resource groups used in the second link of the first radio access network node or the next-hop radio access network node accessing the first radio access network node, a group of resource information that is in the at least two groups of resource information, a grouping mode of a transmission resource used in the second link, an index value of the grouping mode of the transmission resource used in the second link, a configuration manner of a transmission resource used in a first link of a previous-hop radio access network node accessed by the first radio access network node and transmission resources used in second links of various groups of the first type of radio access network nodes, an index value of the configuration manner, a configuration manner of transmission resources used in the second links of the various groups of the first type of radio access network nodes, or an index value of the configuration manner of the transmission resources used in the second links of the various groups of the first type of radio access network nodes.

15. The resource allocation apparatus according to claim 14, wherein the global resource configuration information further comprises a transmission resource group used in the first link or transmission resource information used in the first link, wherein the transmission resource group used in the first link comprises the transmission resource information used in the first link, and wherein a resource indicated by the transmission resource information used in the first link is a transmission resource used in a first link of each hop of the first radio access network node in the first type of radio access network nodes.

16. The resource allocation apparatus according to claim 14, wherein the global resource configuration information further comprises transmission resource indication information used in the first link, which indicates that a first link of the first radio access network node uses the transmission resource used in the second link of the next-hop radio access network node, or a subset thereof.

* * * * *